(12) United States Patent
Tian et al.

(10) Patent No.: US 8,051,186 B2
(45) Date of Patent: Nov. 1, 2011

(54) METHOD FOR DEVICE CAPABILITY NEGOTIATION, METHOD, SYSTEM AND DEVICE FOR SYNCHRONIZATION

(75) Inventors: Linyi Tian, Shenzhen (CN); Xiangzhou Guo, Shenzhen (CN); Jiao Kang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 12/241,937

(22) Filed: Sep. 30, 2008

(65) Prior Publication Data

US 2009/0144434 A1 Jun. 4, 2009

Related U.S. Application Data

(63) Continuation of application No. PCT/CN2007/001018, filed on Mar. 29, 2007.

(30) Foreign Application Priority Data

Mar. 30, 2006 (CN) .......................... 2006 1 0070975

(51) Int. Cl.
*G06F 15/16* (2006.01)
(52) U.S. Cl. ....................................................... 709/228
(58) Field of Classification Search ........................ None
See application file for complete search history.

(56) References Cited

U.S. PATENT DOCUMENTS

| 7,669,121 B2 * | 2/2010 | Kiilerich ........................ 715/249 |
| 2003/0081557 A1 | 1/2003 | Mettala et al. |
| 2004/0083472 A1 | 4/2004 | Rao et al. |
| 2004/0171382 A1 | 9/2004 | Mittal |
| 2005/0041578 A1 | 2/2005 | Huotari et al. |
| 2005/0165947 A1 | 7/2005 | Auriemma et al. |
| 2005/0256959 A1 | 11/2005 | Svensson et al. |
| 2007/0277169 A1 * | 11/2007 | Rao et al. ........................ 717/173 |
| 2008/0235317 A1 * | 9/2008 | Burgmans ........................ 709/201 |
| 2008/0304438 A1 * | 12/2008 | Stille .............................. 370/328 |

FOREIGN PATENT DOCUMENTS

| EP | 1592184 A2 | 11/2005 |
| WO | 00/67501 A1 | 11/2000 |
| WO | 03/094435 A1 | 11/2003 |

(Continued)

OTHER PUBLICATIONS

International Search Report for International Application No. PCT/CN2007/001018, dated Jul. 5, 2007, with English Abstract thereof.

(Continued)

*Primary Examiner* — Moustafa M Meky
*Assistant Examiner* — Clayton R Williams

(57) ABSTRACT

Method for device capability negotiation, and method, system and device for synchronization. The synchronization system includes a synchronization server and a synchronization client. The synchronization server or the synchronization client is adapted to skip the device capability negotiation and directly perform a synchronization with the synchronization server and the synchronization client when the negotiated device capability or status ID, or the status ID indicating that the device capability has not been changed and has been stored. The method for device capability negotiation includes receiving an operation request carrying a parameter requesting a device capability negotiation; determining that the session is a device capability negotiation session according to the parameter requesting the device capability negotiation, carried by the request; returning a response and performing the device capability negotiation; storing results of the device capability negotiation. Embodiments of the present invention can improve the synchronization efficiency.

8 Claims, 12 Drawing Sheets

FOREIGN PATENT DOCUMENTS

| | | |
|---|---|---|
| WO | 03/103271 A1 | 12/2003 |
| WO | 2004/023233 A2 | 3/2004 |
| WO | 2005/001665 A2 | 1/2005 |

OTHER PUBLICATIONS

Lockhart, Robert K., et al.; "Specifications for Ir Mobile Communications"; Specifications for Ir Mobile Communications (IRMC); XX, XX; Mar. 1, 1999; XP002155443; pp. 29-44.

European Search Report for European Application No. 07720592.0, dated Feb. 18, 2009.

Song Qihong, et al.; A New Mobile Application—SyncML Equipment Management; Modern Science & Technology of Telecommunications; Sci-Tech Watch; Mar. 3, 2003; pp. 32, 33, and 42; China Academic Journal Electronic Publishing House.

Chinese Office Action for Chinese Patent Application No. 2006100709757, dated Apr. 10, 2009, and English translation thereof.

"SyncML Data Sync Protocol"; Candidate Version 1.2—Jun. 1, 2004; Open Mobile Alliance; OMA-SyncML-DataSyncProtocol-V1_2-200400601-C; 77 pages.

"SyncML Device Information"; Candidate Version 1.2—Jun. 1, 2004; Open Mobile Alliance; OMA-SyncML-DevInfo-V1_2-200400601-C; 60 pages.

"OMA Device Management Protocol"; Draft Version 1.2—Jan. 25, 2005; Open Mobile Alliance; OMA-DM-Protocol-V1_2_0-20050125-D; 42 pages.

"OMA Device Management Representation Protocol"; Draft Version 1.2—Jan. 31, 2005; Open Mobile Alliance; OMA-TS-DM-RepPro-V1_2_0-20050131-D; 47 pages.

Chinese Rejection Decision for Chinese Patent Application No. 200610070975.7, mailed Apr. 29, 2010, and partial English translation thereof; 28 pages.

European Office Action for European Patent Application No. 07720592.0, dated May 5, 2010.

English translation of the Written Opinion of the International Searching Authority for International Application No. PCT/CN2007/001018, dated Jul. 5, 2007.

European Office Action for European Patent Application No. 07720592.0, dated Jul. 15, 2011.

* cited by examiner

METHOD FOR DEVICE CAPABILITY NEGOTIATION, METHOD, SYSTEM AND DEVICE FOR SYNCHRONIZATION

CROSS-REFERENCE TO RELATED APPLICATIONS

The application claims the priority of CN application No. 200610070975.7, filed on Mar. 30, 2006 with the State Intellectual Property Office of the People's Republic of China, entitled "Methods and Systems for Device Capability Negotiation", the entire contents of which are incorporated herein by reference.

FIELD

Embodiments of the present invention relate to technical fields regarding data synchronization specification (SyncML Data Synchronization), more specifically, to methods for a device capability negotiation, and methods, systems and devices for synchronization.

BACKGROUND

The industry organization, SyncML Iniative, founded in February, 2000, aims at formulating a standard specification which enables synchronization of personal information and data within enterprises over multiple platforms and networks. The purpose of developing SyncML is to enable the end-user, device developer, infrastructure developer, data provider, application software developer as well as service provider to cooperate with each other and tangibly achieve the goal of accessing any network data anytime and anywhere using any terminal device. A typical application for SyncML data synchronization is the data synchronization between mobile devices or application servers, and network servers. In addition, SyncML may be further applicable to data synchronization between peer-to-peer entities, such as between two PCs.

FIG. 1 illustrates a schematic system diagram of implementing data synchronization. The system for implementing synchronization includes a SyncML client and a SyncML server. After the SyncML client and server implement a parameter negotiation in synchronization initialization stage, they exchange their modified data so as to ensure data synchronization between the two parties.

Data synchronization can be categorized into a plurality of types, which are detailed in Table 1 for reference.

TABLE 1

| Data Synchronization Type | |
| --- | --- |
| Sync Type | Description |
| Two-way sync | Two-way sync is a normally used synchronization approach in which the sync client and server simply exchange (do not exchange the unmodified) information about modified data in these devices. The client sends the modification information first. |
| Slow sync | Slow sync is a special type of two-way sync. The difference lies in that the data must be compared on a piece-by-piece and field-by-field basis, which means that, during synchronization, both the client and the server shall send all the data in a local database to the other side and then the server or client does the synchronization analysis between each piece of received data and each piece of data that it stores on a field-by-field basis. |
| One-way sync from | One-way sync from client only is a one-way sync approach. Only the client sends its information about |

TABLE 1-continued

| Data Synchronization Type | |
| --- | --- |
| Sync Type | Description |
| client only | data modification to the server. The server does not send its modification information to the client. |
| Refresh sync from server only | Refresh sync from client only is a one-way sync approach. The client sends all the data in the local database to the server. The server replaces all the data in the database of the server with the data from the client. In other words, the data in the server is identical to the data in the client, without any less or more, or different records. |
| One-way sync from server only | One-way sync from server only is similar to one-way sync from client only. Only the server sends its information about data modification to the client. The client does not send its modification information to the server. |
| Refresh sync from server only | Refresh sync from server only is similar to refresh sync from client only. The server sends all the user data in the database to the user client. The client replaces all the data in the client database with the data from the server. In other words, the data in the client is identical to the data in the server, without any less or more, or different records. |
| Server Alerted Sync | The server alerted sync refers to that the server first alerts the client to perform a synchronization operation. In other words the server informs the client to start a specific type of the synchronization operation. Only the server informs the client and requests the client to initiate a type of synchronization. The subsequent synchronization procedure may be the above six synchronization types. |

The two-way synchronization is provided below merely as an example illustrating the process of data synchronization in detail. The other synchronization types are special scenarios of the two-way synchronization. For instance, the slow synchronization may be regarded as two-way synchronization in which the client and the server send all the data; the one-way synchronization is two-way synchronization in which the synchronization data is sent in one-way direction; the refresh synchronization is slow synchronization in which the synchronization data is sent in one-way direction.

Referring to FIG. 2, the synchronization procedure specified in the SyncML specification are typically divided into three stages:

The first stage, steps Pkg#1-Pkg#2, is a synchronization initialization stage, in which the SyncML client and server primarily perform identity authentication and a device capability negotiation, the device capability including data associated with the device, such as OEM, model, version, and the like; data associated with synchronization data, such as supported synchronization data types, properties, parameters, and the like; data associated with data storage, such as data storage capability, synchronization data type and method supported by the storage, and the like; and data associated with extension mechanism, such as the name of extension element and the like. The interaction process during this stage usually lasts for several times before completion.

During this stage, in the initialization message (SyncML Initialization Message) sent by the synchronization client (Data Sync Client, hereinafter "DS client"), the device capability of the client is included in its command tag <Put>; its command tag <Get> is used to request device capability of the synchronization server (Data Sync Server, hereinafter "DS server"). If the DS client does not require device capability of the server, the client may not send <Get> command.

The positions of DS client and DS server are equal. If the DS client does not use <Put> command to send device capability, the DS client may use <Get> command to request the client to send the device capability.

The next stage is entered only after the client and server fully completes identity authentication and a device capability negotiation.

The second stage, steps Pkg#3-Pkg#4, is a synchronization stage, which is mainly used in one of the client and server. According to the status of the data, such as Add, Update, Delete, and Move, the changed data is sent to the other end (the client or server) by operation command and the other end performs the same operation according to these commands to achieve synchronization purpose.

The third stage, steps Pkg#5-Pkg#6, is a synchronization completion stage which is mainly used in confirming by the client and server the completion of synchronization with each other.

The inventors of the present invention found at least the following issues in terms of the prior art in the course of creating the present invention. Generally, all of the prior arts include a device capability negotiation process during synchronization initialization. Such process takes relatively a lot of time so that the data synchronization process is unnecessarily be prolonged, resulting in a lower synchronization efficiency. The details can be deduced through the below analysis.

It can be seen from the existing synchronization procedure that the synchronization initialization needs to be executed initially every time before the data synchronization is performed, and the synchronization initialization generally includes a a device capability negotiation process. However, in practice, the device capability does not change frequently. Even if the device capability is changed, it is likely that only parts of the information changes. Furthermore, sending all the device capability would lead to a huge amount of data, which prolongs the time for data synchronization accordingly.

In addition, because the existing device capability includes descriptions associated with data format, there exists a coupling relationship between the data synchronization protocol and the data to be synchronized. In other words, every time a new data format is added, or the device capability is modified, the data synchronization specification will be somewhat affected.

It is apparent that improving the synchronization efficiency is an impending issue that needs to be solved.

SUMMARY

In view of this, embodiments of the present invention are directed to providing methods for a device capability negotiation, synchronization methods as well as synchronization system, synchronization device, synchronization server, DM server, DM client, synchronization client, all of which are able to improve synchronization efficiency.

The above aspects of embodiments of the present invention are implemented as follows.

A method for synchronization is provided as a first technical solution. The method includes: initiating a synchronization procedure between a first device and a second device; determining whether device capability or status ID, or the status ID indicating that the device capability has not been changed or has been stored after a previous a device capability negotiation; skipping a device capability negotiation to perform a synchronization operation when the negotiated device capability or status ID, or the status ID indicating that the device capability has not been changed, is stored.

A method for a device capability negotiation is provided as a second technical solution. The method includes: receiving an operation request. The operation request carries a parameter requesting a device capability negotiation; determining that the current session is a device capability negotiation session according to the parameter requesting a device capability negotiation, carried by the request; returning a response and performing a device capability negotiation; storing the results of the a device capability negotiation and closing the session.

A method for the device capability negotiation is provided as a third technical solution. The method includes: receiving a request for the device capability negotiation; returning own device capability; and storing the negotiation results and closing the session.

A system for synchronization is provided as a fourth technical solution. The system includes a synchronization server and a synchronization client, the synchronization server or synchronization client being adapted to skip the a device capability negotiation and directly perform a synchronization operation with the synchronization server and the synchronization client when the negotiated device capability or status ID, or the status ID indicating that the device capability has not been changed and has been stored.

A device for synchronization is provided as a fifth technical solution. The device includes a configuration unit adapted to store the negotiated device capability or status ID, or the status ID indicating that the device capability has not been changed; a synchronization-triggering unit adapted to skip the process of the a device capability negotiation and directly trigger a synchronization operation when the negotiated device capability or status ID, or the status ID indicating that the device capability has not been changed and has been stored.

A server for synchronization is provided as a sixth technical solution. The server includes a request receiving unit adapted to receive in a session an operation request that carries a parameter requesting the a device capability negotiation; a session type determination unit adapted to determine that the current session is a device capability negotiation session according to the parameter requesting a device capability negotiation, carried by the operation request; a negotiation unit adapted to perform the device capability negotiation after the current session is determined to be the device capability negotiation session; and a session control unit adapted to store the results of the device capability negotiation and close the session.

A DM server is provided as a seventh technical solution. The server includes a request receiving unit adapted to receive in a session an operation request that carries a client synchronization management object identifier requiring the DM server to acquire; a session type determination unit adapted to determine that the current session is a device capability negotiation session according to the operation request; a negotiation unit adapted to issue a specific operation command according to the client synchronization management object identifier after the current session is determined to be the device capability negotiation session and receive a reported client device capability; a forwarding unit adapted to send the received the client device capability to a synchronization server.

A DM client is provided as an eighth technical solution. The client includes a request receiving unit adapted to receive in a session a request for the device capability of the synchronization client; a device capability acquiring unit adapted to read the data from all or parts of the nodes to which the configured synchronization management object of the synchronization client corresponds and obtain the client device capability to be reported; a reporting unit adapted to initiate an operation request towards DM server, the operation request including a request for initial session connection, carrying device capability.

A DM client is provided as a ninth technical solution. The client includes an operation command requesting unit adapted to initiate a request for initial session connection towards DM server and carry, in the request for initial session connection, a client synchronization management object identifier requiring the DM server to acquire; an operation command receiving unit adapted to receive an operation command corresponding to the client synchronization management object identifier, a device capability requiring unit adapted to read the data from all or parts of the nodes to which the configured synchronization management object of the synchronization client corresponds and obtain the client device capability to be reported; a reporting unit adapted to send towards the DM server response information to the operation command, the respond information carrying the client device capability.

A server for synchronization is provided as a tenth technical solution. The server includes a request receiving unit adapted to receive an operation request that carries a parameter requesting a device capability negotiation, the parameter carrying information for acquiring the device capability of the synchronization server; a session type determination unit adapted to determine that the current session is a device capability negotiation session according to the parameter requesting a device capability negotiation, carried by the operation request; a negotiation unit adapted to deliver its own device capability down to a synchronization client after the current session is determined to be the device capability negotiation session and is adapted to inform the synchronization client to store the results of the device capability negotiation and close the session.

A DM server is provided as an eleventh technical solution. The server includes a request receiving unit adapted to receive in a session an operation request that carries a parameter requesting a device capability negotiation, the parameter carrying information for acquiring device capability of the synchronization server; a session type determination unit adapted to determine that the current session is a device capability negotiation session according to the parameter requesting a device capability negotiation, carried by the operation request; a device capability acquiring unit adapted to acquire device capability from the synchronization server after the current session is determined to be the device capability negotiation session; a delivering unit adapted to deliver the device capability of the synchronization server down to the synchronization client via a DM client for storage and close the session.

A method for synchronization is provided as a twelfth technical solution. The method includes initiating by a synchronization client an operation request toward a synchronization server; performing synchronization if the synchronization server determines that the received operation request is a request for data synchronization and after the device capability or status ID, or the status ID indicating that the device capability has not been changed and has been stored; or performing a device capability negotiation if the synchronization server determines that the received operation request is a request for a device capability negotiation.

It can be seen from the foregoing first technical solution that an embodiment of the present invention skips a process of the device capability negotiation by determining whether the previous device capability negotiation stores the device capability or status ID, or the status ID indicating that the device capability has not been changed, to determine that the session does not require a device capability negotiation. As such, the synchronization protocol is simplified and the synchronization efficiency is improved. Moreover, changes in a synchronization procedure due to the changes in a device capability negotiation procedure can be avoided and the technical problem that the data synchronization specification is frequently modified can thus be avoided.

It can be seen from the foregoing second technical solution that an embodiment of the present invention distinguishes itself from the prior art by identifying the type of operation request to determine that the current session is a device capability negotiation session, such that the device capability negotiation can be performed independently and the results of the negotiation can be stored. As a result, the device capability negotiation process can be skipped for the next synchronization and the synchronization efficiency is improved. Moreover, changes in the synchronization procedure due to the changes in the device capability negotiation procedure can be avoided and the technical problem that the data synchronization specification is frequently modified can thus be avoided.

It can be seen from the foregoing third technical solution that an embodiment of the present invention determines that the current session is a device capability negotiation session when a request for a device capability negotiation is received. Therefore, its own device capability can be informed to the other end such that the device capability negotiation process can be skipped for the next synchronization and the synchronization efficiency is improved. Moreover, changes in the synchronization procedure due to the changes in the device capability negotiation procedure can be avoided and the technical problem that the data synchronization specification is frequently modified can thus be avoided.

It can be seen from the foregoing forth and fifth technical solutions that an embodiment of the present invention skip a process of a device capability negotiation by determining whether the device capability or status ID, or the status ID indicating that the device capability has not been changed, is stored to determine that the current session does not require a device capability negotiation. As such, the synchronization protocol is simplified and the synchronization efficiency is improved. Moreover, changes in the synchronization procedure due to the changes in the device capability negotiation procedure can be avoided and the technical problem that the data synchronization specification is frequently modified can thus be avoided.

It can be seen from the foregoing sixth, seventh, eighth, ninth, tenth, eleventh technical solutions that according to embodiments of the present invention, the synchronization client and the synchronization server cooperate with each other, or the synchronization client, DM client, DM server and the synchronization server cooperate, one with another, to implement the functionality of separately performing the device capability negotiation and storing the results of the negotiation. As a result, the device capability negotiation process can be skipped for the next synchronization and the synchronization efficiency is improved. Moreover, changes in the synchronization procedure due to the changes in the device capability negotiation procedure can be avoided and the technical problem that the data synchronization specification is frequently modified can thus be avoided.

It can be seen from the foregoing twelfth technical solution that an embodiment of the present invention is able to not only skip the device capability negotiation process under certain circumstances, but also to perform a device capability negotiation if the device capability negotiation is needed according to the information indicating whether the device capability negotiation is needed and the procedure of direct synchronization or a device capability negotiation, such that the technical effect of improving synchronization efficiency can be achieved.

DRAWINGS

DETAILED DESCRIPTION

The detailed illustration is further made below to embodiments of the present invention in conjunction with the annexed drawing and the embodiments.

One aspect of embodiments of the present invention is to provide a session type that simply negotiates device capability. After a negotiation of the device capability is performed, the client and/or the server store the negotiated device capability respectively for use by the subsequent synchronization. In a scenario where such information has not been modified or lost, no negotiation is performed at each initialization stage of a synchronization session such that the device capability negotiation process is independent of the synchronization process and the number of times and frequency of the negotiations are thus reduced. Moreover, such independent negotiation process may negotiate all of the device capability, or may only negotiate the part of the device capability which was modified last time, or only negotiate the device capability required in the current synchronization interaction.

Two aspects, in terms of actively initiating a request by a DS client and actively initiating a request by a DS server, are illustrated below.

Figure 1:
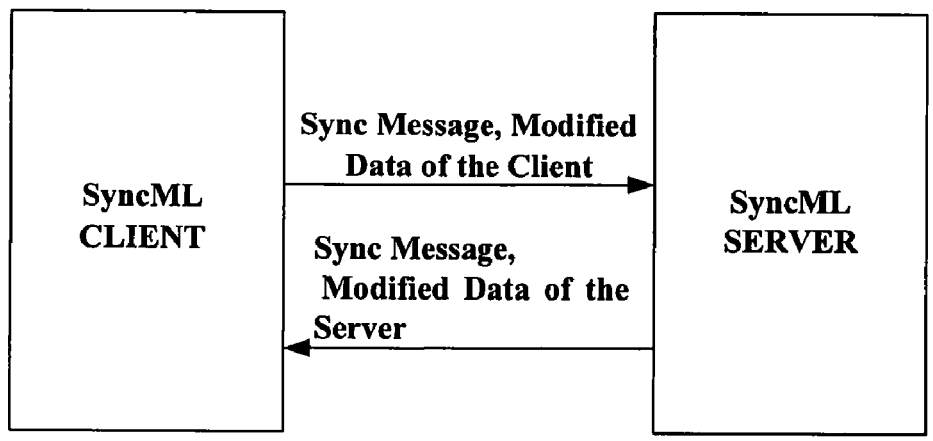
FIG. 1 is a schematic illustration of a synchronization system according to the prior art.
Figure 2:
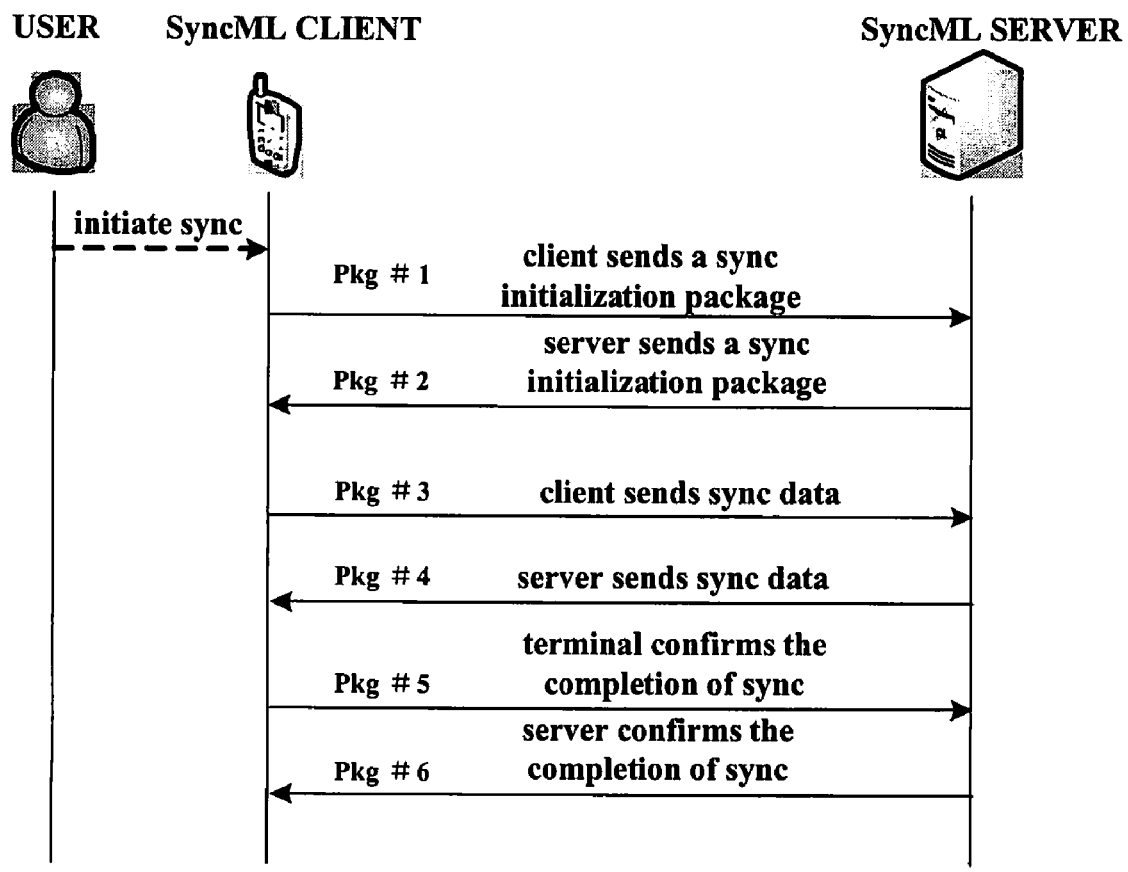
FIG. 2 is an illustration of a flowchart of a SyncML synchronization method according to the prior art.
Figure 3:
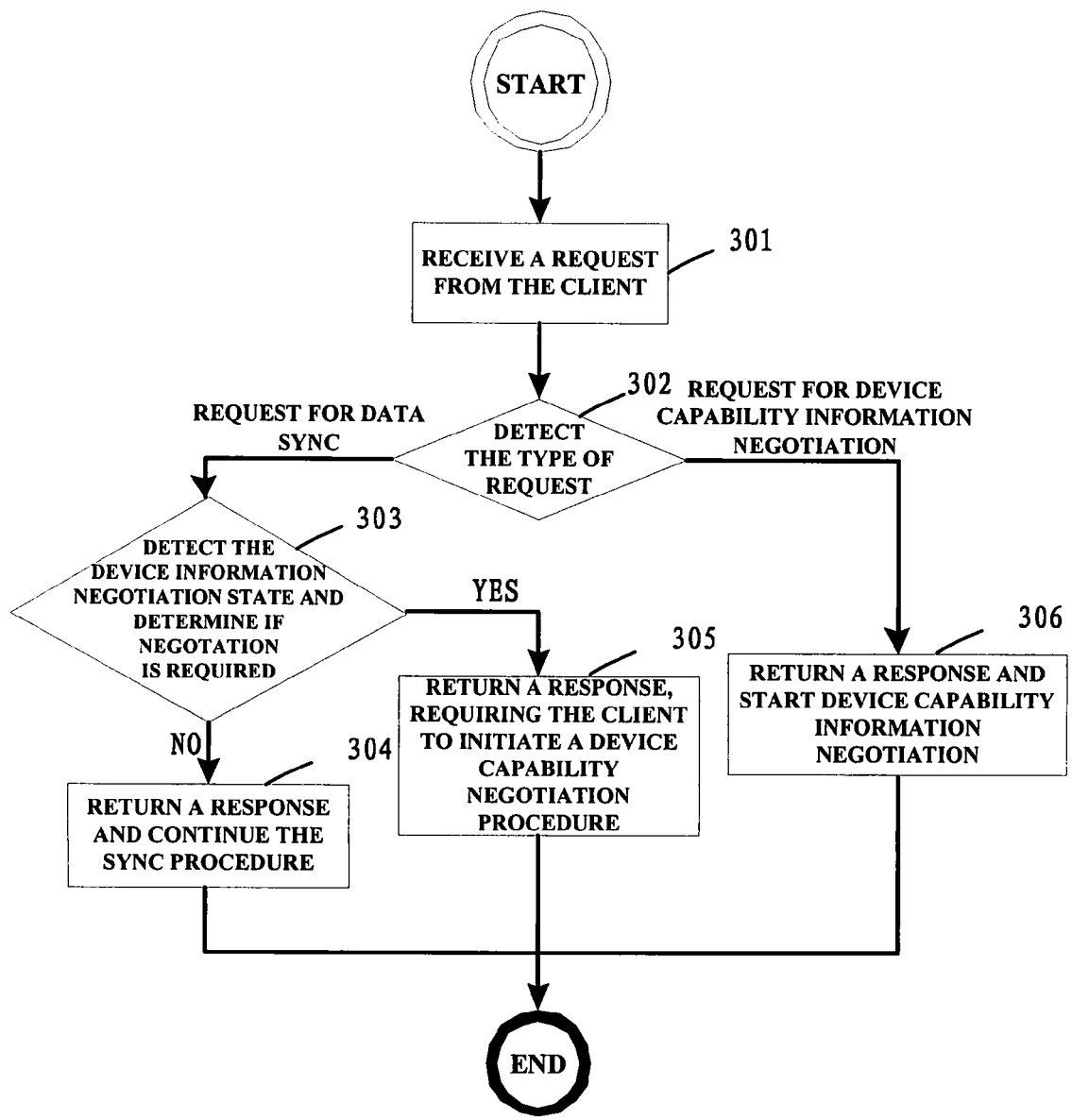
FIG. 3 is an illustration of a flowchart of a method for device capability negotiation method and a first embodiment of the synchronization method according to embodiments of the present invention.

FIG. 3 is an illustration of a flowchart of device capability negotiation method and a first embodiment of the synchronization method according to embodiments of the present invention. The figure is illustrated with respect to actively initiating a request by a DS client.

At step 301, a synchronization procedure is initiated between a DS server and a DS client. The step includes receiving by the DS server an operation request from the DS client. The operation request may be a request for a data synchronization or a request for a device capability negotiation.

In this step, status codes, 200 to 205, are used to indicate that the client request the server for a synchronization type used in synchronization. 206 to 210 indicate that the server sends notification to the client, requesting the synchronization type initiated by the client. In this embodiment, the operation request carries the parameter which request for a device capability negotiation. For instance, 230 and 231 may be added to indicate respectively that the client and the server request the other end to initiate a device capability negotiation.

At step 301, if the status codes carried by the operation request sent from the client to the server is any one of 200 to 205, it is a synchronization request; if it is 230, the current session is determined to be a device capability negotiation session according to the status code 230 carried by the request. The operation request is a request for a device capability negotiation.

At step 302, the DS server determines if the received request is a request for a data synchronization or a request for a device capability negotiation. If it is a request for data synchronization, step 303 is executed. If it is a request for a device capability negotiation, step 306 is executed.

At step 303, the DS server checks whether the current session requires a device capability negotiation. One implementation of this step is to determine whether the device capability or status ID, or the status ID indicating that the device capability is not changed is stored after the previous device capability negotiation.

The stored device capability or status ID, or the status ID indicating that the device capability is not changed is obtained or set after the previous a device capability negotiation. The stored device capability or status ID, or the status ID indicating that the device capability is not changed serves as a basis for determining if a device capability negotiation is needed upon the next synchronization.

The detection process described above is illustrated as follows. The DS server determines if it has the status ID, which corresponds to an ID of the synchronization client initiating the request, indicating the completion of the device capability negotiation, status ID indicating that the device capability negotiation has been changed, or if it has stored the device capability required by the current synchronization.

When the DS server has stored the negotiated device capability or status ID, or the status ID indicating that the device capability has not been changed, the device capability negotiation is skipped and step 304 is executed; otherwise, step 305 is performed to implement a device capability negotiation.

At step 304, a response to the received request is returned and the process proceeds to perform synchronization and ends.

At step 305, a response to the received request, which requests the DS client to perform a device capability negotiation, is returned.

At step 306, a device capability negotiation is performed; the results of the device capability negotiation are stored and the session ends. The device capability negotiation is conducted according to one of the following approaches:

1 negotiate all or a part of the device capability;

2) only negotiate the device capability which the current synchronization interaction requires;

3) negotiate the associated device capability according to the data type;

4) negotiate the device capability which is specified by a URI to wait for negotiation;

5) negotiate the device capability which is specified by an expression to wait for negotiation.

The negotiation approach described above may be stored in the DS server as well as in the DS client. When storing in the DS client, it can be reported to DS server by incorporating the approach in the request. For instance, in the third approach, the sent operation request carries a parameter requesting a device capability negotiation. The parameter can be a data type indicative of negotiating all of the device capability, a data type carrying information of negotiating the associated device capability, a URI specifying the device capability to be negotiated, or an expression specifying the device capability to be negotiated.

The operation request for a device capability negotiation includes commands of add, update, delete or query and when the parameter is the URI that specifies the device capability to be negotiated, the approach for the device capability negotiation includes acquiring device capability via operation command of XCAP protocol according to such URI. It can be seen from the above description that the foregoing embodiments determines if the device capability negotiation is needed according to step 303. When there is no need for a device capability negotiation, the process of a device capability negotiation can be skipped. In this way, the technical defect according to the synchronization procedure of prior art that the process of a device capability negotiation is frequently required such that the synchronization efficiency is not high can be overcame. The embodiments not only simplifies the synchronization protocol, improves the synchronization efficiency, but also avoids the changes in a synchronization procedure due to the changes in the device capability negotiation process negotiation procedure and thus avoids the technical problem that the data synchronization specification is frequently modified.

Moreover, step 302 is utilized to determine whether it is a request for data synchronization or a request for a device capability negotiation and to separate the device capability negotiation process from the synchronization procedure. The session ends after the completion of negotiation in step 306. As such, the device capability negotiation becomes an independent process and provides a technical alternative for simplifying synchronization protocol and improving the synchronization efficiency.

In addition, when a device capability negotiation is needed, step 306 provides flexible approaches for the device capability negotiation. It is possible that only a part of the device capability is negotiated, which may simplify the interaction process and reduce the amount of data throughput, and may further improve the efficiency in a device capability negotiation or synchronization.

In another embodiments, after the client receives the response at step 305, the device capability requested by the DS server is included in the sent synchronization request to complete subsequent a data synchronization operation. Also, the data synchronization operation and the operation in step 306 may be within the same session, or within separate sessions. At last, the session ends after completion of the synchronization.

If the operation request initiated by the DS clients towards the DS server is a request for a device capability negotiation, then, before executing step 306, a process of performing initialization of identity authentication between the DS client and DS server is included. After the authentication is passed, the process proceeds to perform 306. A process of updating status ID is further included after step 306 so as to ensure a complete and adequate ending of the process. In other words, the authentication initialization operation before the interaction to be carried out by the independent operation of the device capability negotiation, and the accompanying acts, i.e., operations such as updating the status, after interaction are performed are included so as to ensure the independency and integrity of the process. However, regarding the device capability negotiation operation in the process of synchronization, there is no need for separate operations such as authentication and status update.

The negotiation request may be a request for reporting the client device capability, and/or a request for the server device capability. Moreover, the request for the device capability negotiation, as mentioned above, may be sent to the synchronization server in manner of device capability operation session (DS), or may be sent to the DS server in manner of synchronization device management (DM) protocol. Likewise, the device capability negotiation operation may be performed via device capability operation session or device management (DM) protocol.

In the foregoing embodiments, the DS server serves as an entity for determining whether the device capability or status ID, or the status ID indicating that the device capability has not been changed or has been stored after the previous device capability negotiation. The status ID indicating that the device capability has not been changed may be included in the operation request reported by the DS client.

In other embodiments, the DS client may serves as an entity for determining whether the device capability or status ID, or the status ID indicating that the device capability has not been changed or has been stored after the previous device capability negotiation. In other words, before the DS client sends the operation request to the DS server, an action for detecting if the current session requires a device capability negotiation is performed without deciding by the DS server if the device capability negotiation is needed such that the session speed is accelerated. At this point, the determining whether the device capability is stored refers to the determining whether the DS server has stored the device capability of DS client. The DS client can obtain from the feedback information of the DS server from the previous device capability negotiation.

It is well-known that the DS specification defines standard management object (MO). The device management (DM) server completes the management action by operating the management object in the terminal device. However, the management objects exist in the form of management tree. The below description briefly illustrates the client synchronization management object (Client DS MO) and the server synchronization management object (Server DS MO) mentioned by the embodiments of the present invention.

The defined Client DS MO and Server DS MO are used to store the client device capability and the server device capability, respectively, and the Client DS MO can be acquired by the server and the Server DS MO can be acquired by the client. Because the management objects exist in the form of management tree, the Client DS MO and Server DS MO are located on the client management tree and the server management tree, respectively. By defining the Client DS MO and Server DS MO as the standardized MO, the ability of reuse of the device capability is enhanced. Such information in the MO was not standardized in prior art. It can be opened for use by other business through DM technology.

Figure 4:
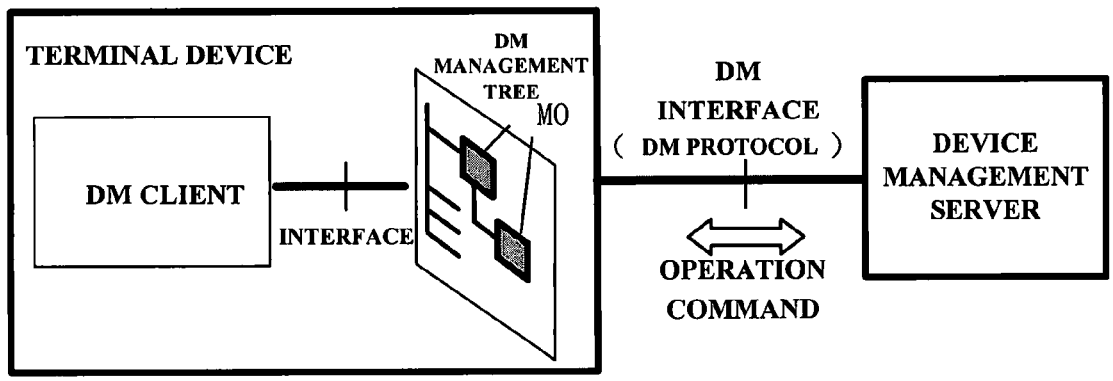
FIG. 4 is an illustration of an architecture of DM specification employed by an embodiment of embodiments of the present invention.

Referring to FIG. 4, associated operation commands may be delivered to the nodes of the management tree via OMA DM protocol. The structure of the data package of the protocol is based on Extensible Markup Language (XML). The nodes of the management tree may include a set of environmental configuration parameters, different types of objects, related operations and some trigger mechanisms, etc., in the device.

Referring to FIG. 4, an illustration of overall architecture of the DM specification employed by the embodiments of the present invention is shown. A DM Agent on the terminal device, i.e., DM client, is used to interact with the DM server to accomplish related management operations. The DM Server is used to provide functionalities of management, diagnose or maintenance of the terminal device. It manages the terminal device via Over the Air (OTA). The management operation includes setting parameters, updating the firmware, installing and upgrading the software, gathering and processing the errors and event information for the terminal device, etc. The terminal device includes cell phone terminal, handheld computer, portable computer, embedded device, vehicle carrier system, etc, and does not exclude any other mobile devices.

Figure 5:
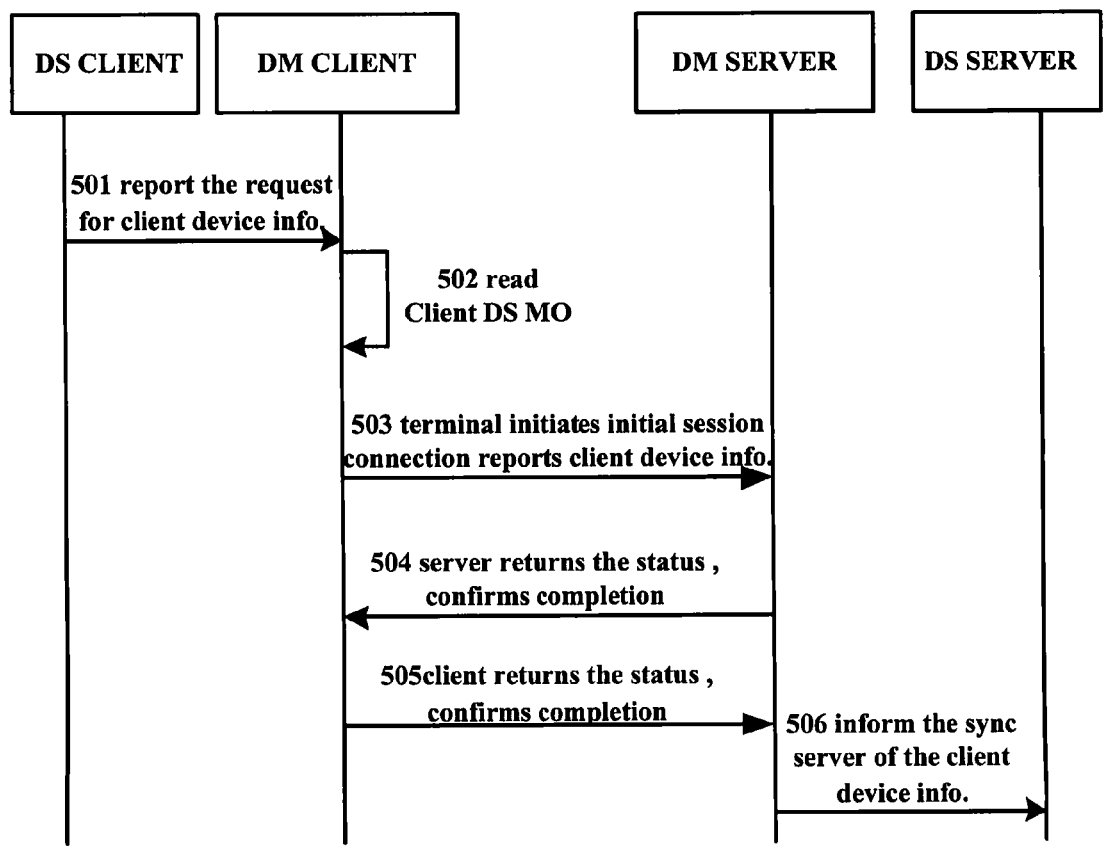
FIG. 5 is an illustration of a flowchart in which DS client reports the client device capability under the DM mode according to a second embodiment of the device capability negotiation method of embodiment of the present invention.

In the case of DM protocol, the process that the foregoing DS client reports the client device capability is illustrated in FIG. 5.

At step 501, the synchronization DS client reports the request for client device capability to the DM client.

At steps 502-505, the DM server initiates a device management procedure according to the received request and informs the DM server to acquire the client device capability to be reported according to the Client DS MO. The details are described below.

The DM client reads the data from all or part of the nodes to which the configured Client DS MO corresponds according to the received request, acquires the client device capability to be reported, and sends, to the DM server, the operation request which carries a parameter requesting a device capability negotiation, for example, the request for initiating an initial session connection. The request includes the client device capability to be reported, serving as the parameter requesting a device capability negotiation.

The DM server receives the operation request including the client device capability to be reported, decides if the DS client requests a device capability negotiation, acquires the client device capability to be reported and then returns response information to the DM client so as to confirm completion. Furthermore, the DM server waits to receive, from the DM client, the response information of confirmation used to confirm the completion of the operation.

The foregoing interaction between DM client and DM server can be of multiple times, which also applies hereinafter.

At step 506, the DM server informs DS server of the acquired client device capability after the DM server acquires the client device capability to be reported.

Figure 6:
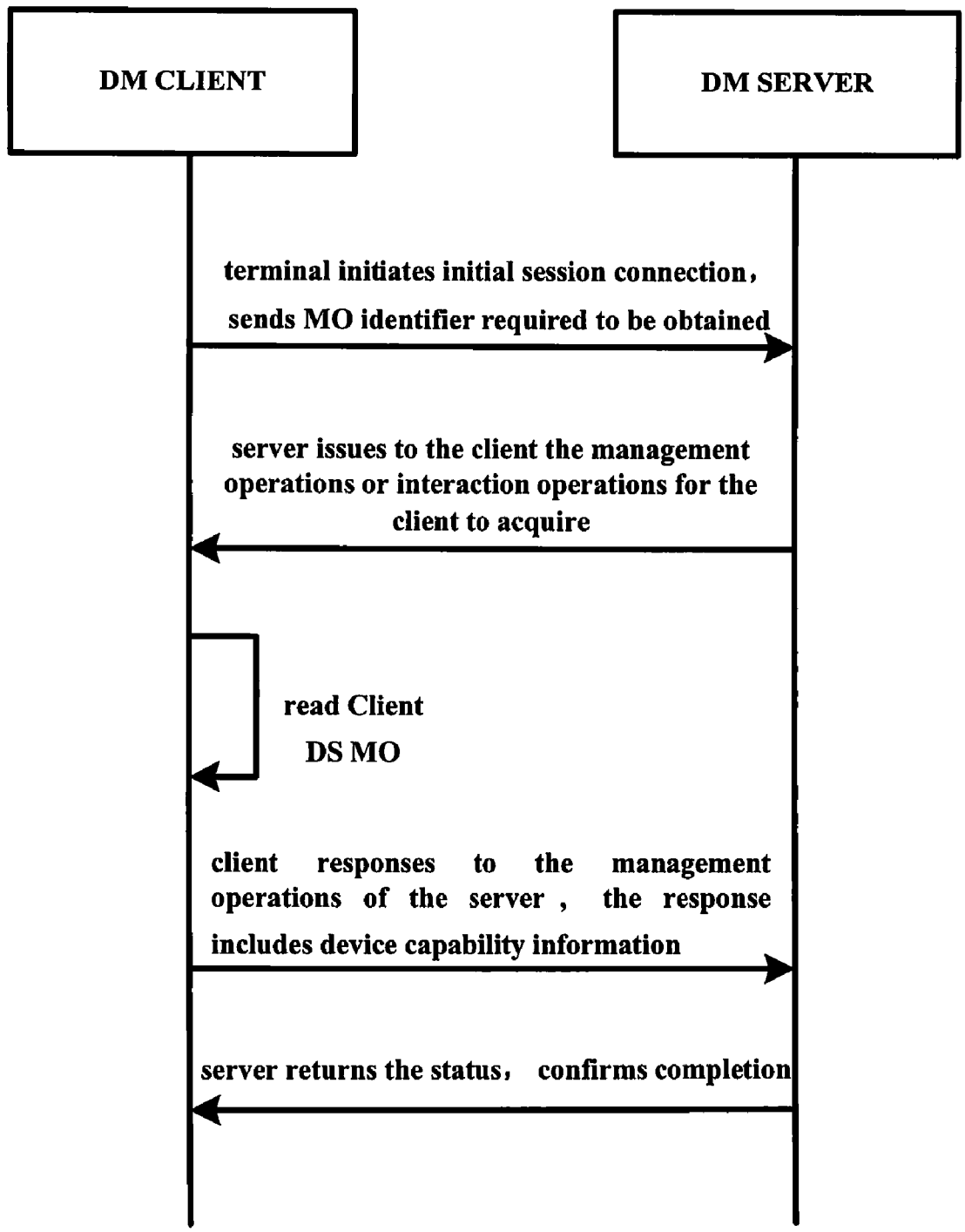
FIG. 6 is an illustration of a flowchart in which DS client reports the client device capability under the DM mode according to a third embodiment of the device capability negotiation method of embodiments of the present invention.

With respect to the steps 502-504 in the FIG. 5, these steps may further be implemented according to the method illustrated in FIG. 6.

Referring to FIG. 6, the DM client initiates a request for initial session connection towards the DM server. The request includes a client synchronization management object identifier requiring the DM server to acquire. The DM server issues a specific operation command, for example, reading all or a particular management tree or a particular node or some nodes to which the configured synchronization DS MO corresponds, according to the received identifier. And then, the DM client obtains the address where the information to be read is located according to the specific operation command issued by the DM server and reads the configured data from all or parts of the nodes to which the Client DS MO corresponds according to the address, and acquires the client device capability to be reported. The DM client then sends the response information to the operation commands of the server. The response information includes the client device capability to be reported. After the DM server receives this information, the DM server acquires the client device capability to be reported and then sends response information to the DM client to confirm completion.

The difference between the embodiments illustrated in FIG. 5 and FIG. 6 is that, in FIG. 5, the DM client directly sends the device capability to be reported, i.e., the detailed data, to the DM server, while, in FIG. 6, the DM client passes the Client DS MO identifier to the DM server and the DM server decides which information are needed and informs the DM client of the decision as the operation command. The DM client then performs corresponding operation according to the operation command. Regardless of any implementations, they are supported by the existing DM protocol.

Figure 7:
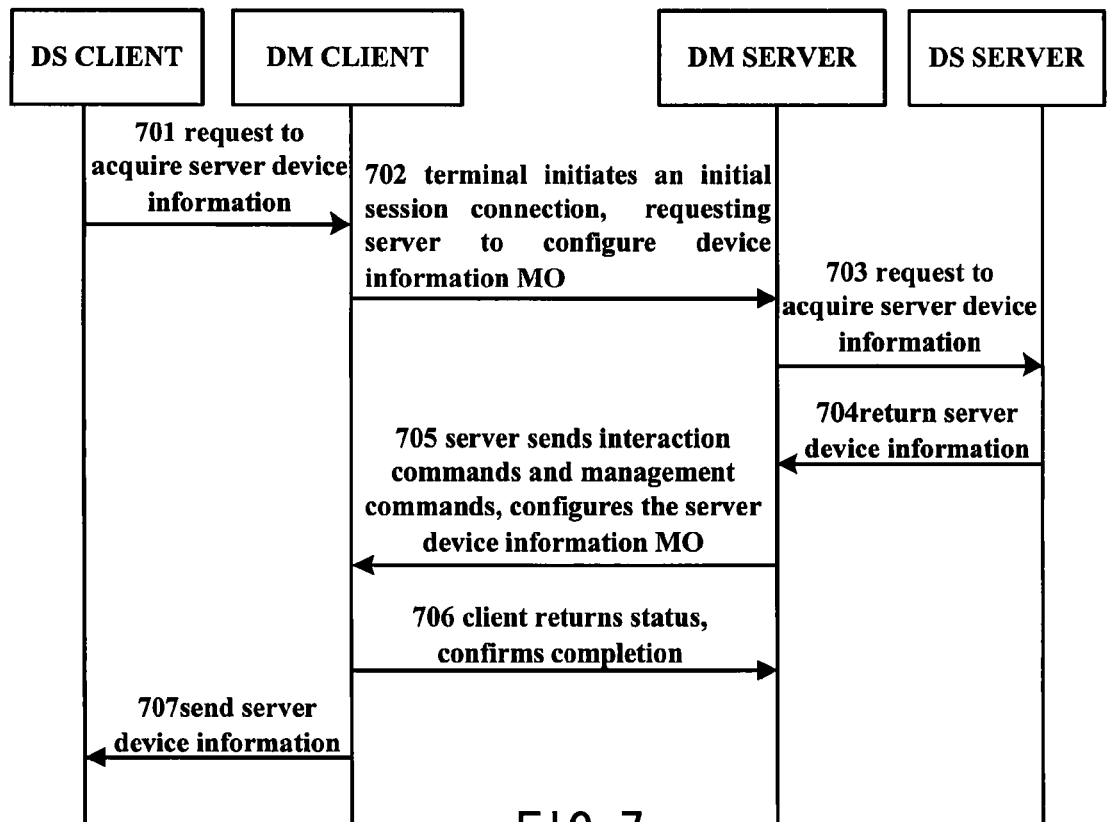
FIG. 7 is an illustration of a flowchart in which DS client requests the server device capability under the DM mode according to a forth embodiment of the device capability negotiation method of embodiments of the present invention.

In the case of DM protocol, the process that the DS client requests the device capability of the DS server is illustrated in FIG. 7.

At step 701, the DS client sends the request for acquiring the device capability of the DS server to the DM client.

At step 702, the DM client initiates a device management procedure according to the request for acquiring the device capability of the DS server and sends the operation request which carries the parameter requesting a device capability negotiation to the DM server. The parameter carries information of acquiring the device capability of the DS server.

In this step, the DM client initiates an initial session connection according to the received request for acquiring the device capability of the synchronization server and sends the operation request which carries the parameter requesting a device capability negotiation to the DM server. The parameter carries the information of acquiring the device capability of the DS server. In other words, the parameter carries the information which requests the DM server to configure the Server DS MO used to store the server device capability.

At steps 703-704, the DM server acquires the server device capability from the DS server according to the received operation request.

The device capability of the DS server is delivered to the DS client via DM client. The details includes step 705 and 706.

At step 705, the DM server configures the Server DS MO via interaction command and management command, and returns the data from all or parts of the nodes to which the Server DS MO corresponds, to the DM client.

At steps 706-707, after the DM client returns the status information to the DM server to confirm completion, the DM client acquires server device capability from the received data from all or parts of nodes to deliver the information down to DS client.

Figure 8:
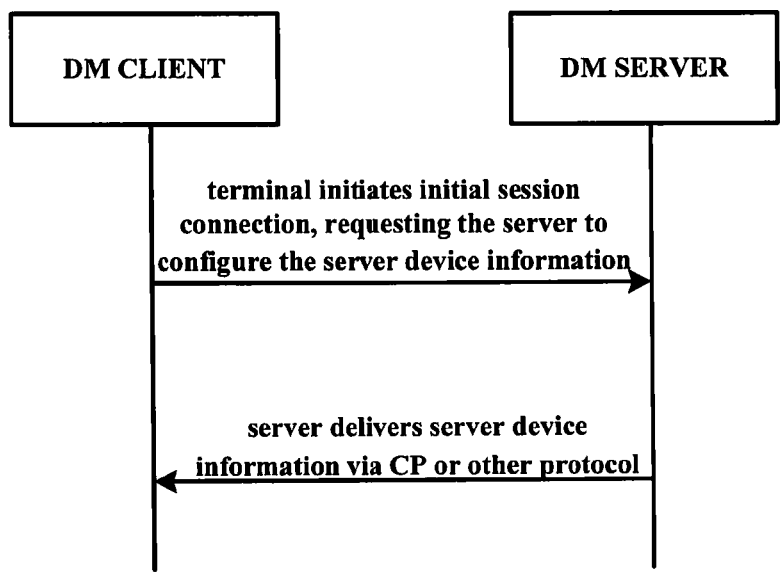
FIG. 8 is an illustration of a flowchart in which DS client requests the server device capability under the DM mode according to a fifth embodiment of the device capability negotiation method of embodiments of the present invention.

With respect to the interaction between the DM client and DM server, steps 702, 705 may also employ the method illustrated in FIG. 8.

Referring to FIG. 8, the DM client initiates an initial session connection according to the received request and requests for server device capability. The DM server delivers the requested server device capability down to the DM client by Client Provisioning (CP) or other protocols, or predetermined formats such as XML format, or WAP Push, or short message or multimedia message.

If the DS client sends the request for a device capability negotiation to the DS server via device capability operation session, then, in the case of synchronizing all the device capability, the process is the same as the process of device capability synchronization in the existing data synchronization procedure except that it is extracted separately and no longer be one of the steps in the data synchronization.

In addition, to accomplish the negotiation of partial device capability, at least one of the following methods is employed.

(1) The associated device capability is negotiated according to data type. In general, the device capability includes a little public information, such as software version number, etc. In addition, it further includes a few information specific to the data types, such as fields specific to phonebook, etc. The client used by the user is often required to synchronize different data types (phonebook, calendar, short message, etc) at different occasions. The MIME type of the synchronization data can be used to inform the other end of the range of the device capability to be negotiated.

(2) URI is used to specify the device capability to be negotiated. In other words, replicas of the device capability of the client and server are also stored on the networks. The device capability may be stored in XML document. The URI can be used to point to the entire document, certain segment, specific element or property value. The HTTP or XCAP (XML Configuration and Access Protocol) can be utilized to implement the access to the document, XCAP being a type of protocol based on HTTP, which acquires and modifies XML document information using HTTP GET and HTTP PUT commands. The XCAP may access XML document according to the URI, the access behavior of which includes acquiring, updating, deleting the whole XML document or acquiring, updating, deleting a specific node or property.

(3) Expression is uses to specify the device capability to be negotiated. The expression can be used to indicate a specific device capability, such as to specify all the device capability related to MIME or all the device capability of which the value type is integer.

The DS client sends the request for a device capability negotiation to the DS server with an attached parameter specifying the way to negotiate the device capability. The direction parameter specifies whether only the DS client sends device capability to the DS server, or only the DS server sends the device capability to the DS client, or both send device capability to each other.

With respect to only sending the part of device capability that changes, commands such as "add", "update", "delete", "query", etc., may be used to instruct the other end to implement the negotiation of partial device capability by adding, replacing or deleting. With respect to the methods of using URI and expression, the changed device capability to which the URI or expression corresponds may be sent to the other end to replace the original device capability in order to implement the negotiation of partial device capability.

Assuming that San Zhang's device capability is described as below.

```
<DeviceCapability>
    <OEM>Huawei Technologies Co., LTD</OEM>
    <Model>3G-001</Model>
    <SoftwareVersion>2.0</SoftwareVersion>
        <HardwareVersion>1.22I</HardwareVersion>
        <DeviceID>1218182THD000001-2</DeviceID>
        <DeviceType>PDA</DeviceType>
    <SupportLargeObjectSync enable="YES"/>
    <MaxSupportedNumberOfChanges>
    <DataStore>
        <Address>./contacts</Address>
        <DisplayName>Phonebook</DisplayName>
        <MaxGUIDSize>32</MaxGUIDSize>
        <Rx-Pref>
            <Type>contacts text/vcard</Type>
            <Version>3.0</Version>
        </Rx-Pref>
        <Tx-Pref>
            <Type>contacts text/x-vcard</Type>
            <Version>3.0</Version>
        </Tx-Pref>
        <SupportedSyncDataCapability>
        <Type>contacts text/ vcard</Type>
        <Version>3.0</Version>
        <Property>
            <PropertyName>BEGIN</PropertyName>
            <PropertyValue>VCARD</PropertyValue>
        </Property>
        </SupportedSyncDataCapability>
        <SupportedSyncType>
            <SyncType>1</SyncType>
            <SyncType>2</SyncType>
            <SyncType>7</SyncType>
        </SupportedSyncType>
    </DataStore>
</DeviceCapability>
```

Then, when the DS client interacts with the DS server for the first time, the foregoing device capability is reported to the DS server using Put command. However, the server stores such information. As long as the device capability does not change, the device capability negotiation is no longer needed by the data synchronization every time from then on.

If the user makes following modifications at the DS client after a period of time,

```
A. change the supports for the large object to "NO".
    <SupportLargeObjectSync enable="NO">
B. add support for a third synchronization type
    <SupportedSyncType>
        <SyncType>1</SyncType>
        <SyncType>2</SyncType>
        <SyncType>7</SyncType>
        <SyncType>3</SyncType>
    </SupportedSyncType>
```

Then, the DS client utilizes the following commands to send the modification to the server such that the server may perform corresponding updating operation.

```
Modification A:
<Update>
        <Level>Property</Level>
        <Path>/DeviceCapability/SupportLargeObject
Sync/@enable</Path>
        <Degree>Update Only</Degree>
        <Data>NO</Data>
</Update>
Modification B:
<Add>
        <Level>Element</Level>
        <Path>/DeviceCapability/SupportedSyncType/SyncType</Path>
    <Data>3</Data>
</Add>
```

The following illustrates the situation where the DS server actively starts the initiation.

Figure 9:
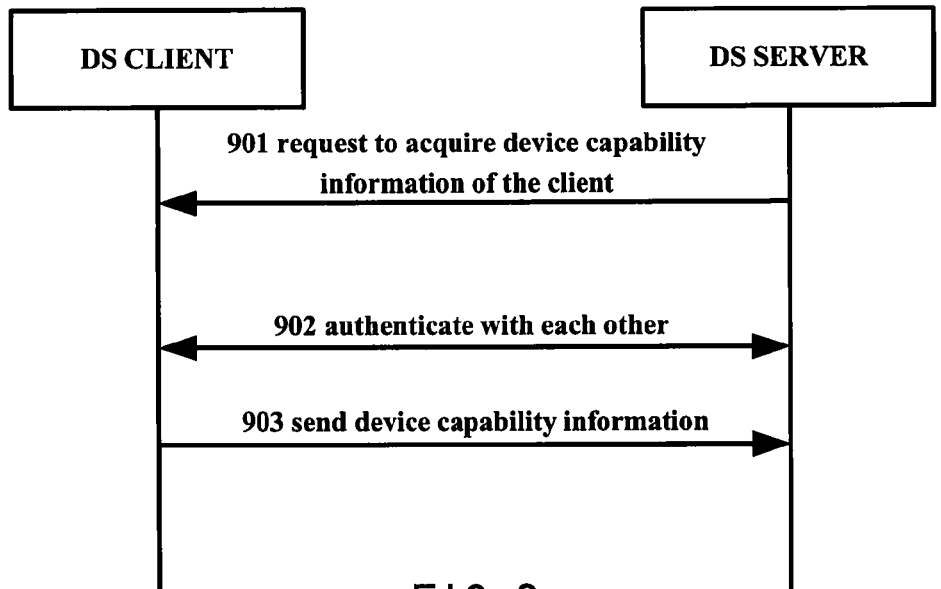
FIG. 9 is an illustration of a flowchart of a sixth embodiment of the device capability negotiation method of embodiments of the present invention.

FIG. 9 is an illustration of another flowchart of the device capability negotiation according to the embodiments of the present invention. By way of example, the figure illustrates the situation where the DS server actively starts the initiation.

At step 901, the DS server sends a request for a device capability negotiation to the DS client, requesting the client to report the device capability.

In prior art, the DS server requests the DS client to initiate a certain type of synchronization by always sending to the DS client the notification which requests the DS client to actively initiate a synchronization request corresponding to the synchronization type specified by the DS server. For instance, when the DS server intends to initiate a two-way synchronization, the DS server may use status code 206 to specify two-way synchronization in the sent notification. The DS client may use status code 200 to initiate a two-way synchronization in the subsequent synchronization request initiated later on. In the embodiments, referring to such mechanism, when the DS server intends to initiate a request for a device capability negotiation, it may send to the DS client a notification carrying a status code 231. Then, the operation request sent from the DS client to the DS server may carry a status code 230 indicating a request for a device capability negotiation.

At step 902, the DS client and the server (which initiates the request) authenticates with each other according to the received request. Step 903 may be performed after the authentication is passed. If the authentication is not passed, then the process directly comes to an end. Alternatively, the authentication may not be performed in this step.

At step 903, the DS client reports its device capability to the DS server.

Based on the implementation of FIG. 9, the DS client may further request for the device capability of the server.

The foregoing request initiated actively by the DS server may be transmitted via DM protocol, or transmitted via device capability operation session. Likewise, the request which is further initiated by the DS client may be transmitted via DM protocol, or transmitted via device capability operation session.

Figure 10:
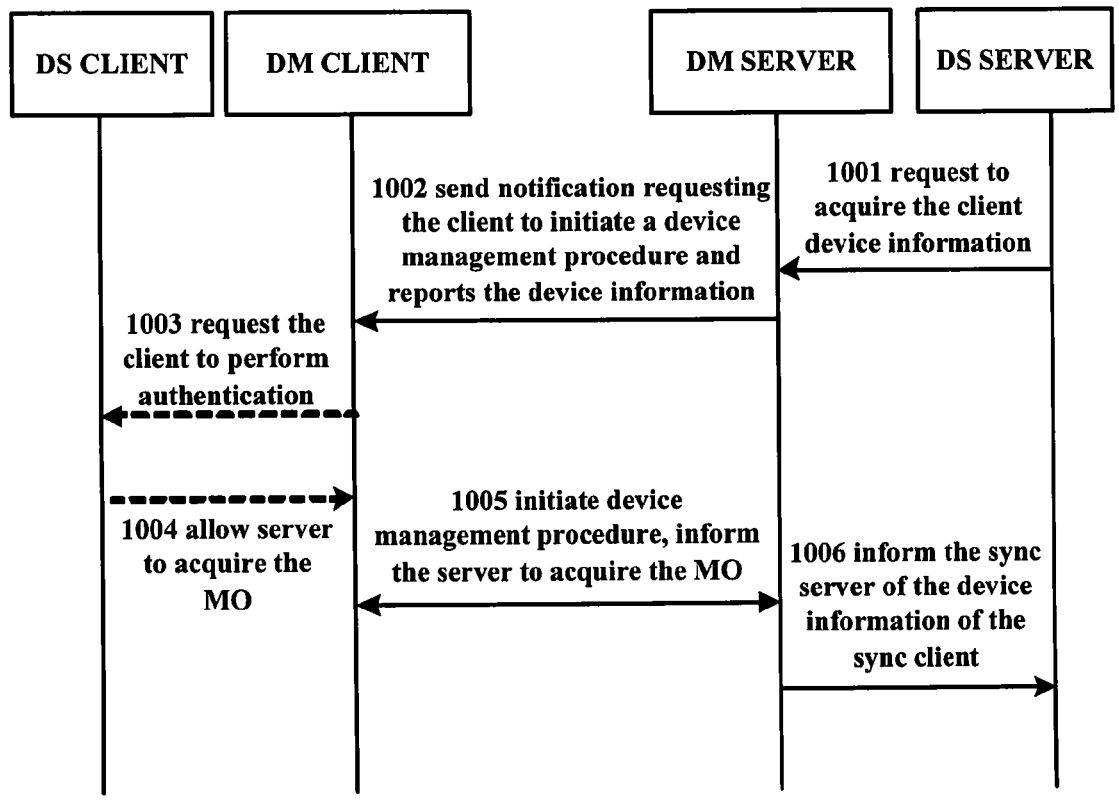
FIG. 10 is an illustration of a flowchart in which DS server actively initiates a device capability negotiation process under the DM mode according to a seventh embodiment of the device capability negotiation method of embodiments of the present invention.

In the case of DM protocol, the process that the foregoing DS server actively initiates a device capability negotiation is illustrated in FIG. 10.

At step 1001, the DS server sends to the DM server a request for acquiring the client device capability.

At step 1002, the DM server sends to the DM client an operation notification, requesting the DM client to initiate a device management procedure and report to the client device capability, according to the received request.

At steps 1003-1004, after the DM client completes the authentication with the DS client according to the received request, the DM client is allowed to read the Client DS MO which is used to store the client device capability. These two steps can be omitted, i.e., the authentication can be skipped.

At step 1005, the DM client acquires the Client DS MO, initiates the device management procedure, and informs the DM server of the MO.

The detailed implementation of this step is the same as that of step 502-504 in FIG. 5. Of course, the implementation illustrated in FIG. 6 may also be employed, the description of which is omitted for brevity.

At step 1006, the DM server informs the DS server of the received client device capability.

In the case of DM protocol, the process that the DS client requests for the server device capability is identical to the method illustrated in FIG. 7, which is omitted for brevity.

In the case of employing device capability operation session, its implementation process is substantially the same as the prior art implementation, except that the process of a device capability negotiation is entirely separated.

With respect to the above embodiments regarding the DM approach, the interfaces between the DS client and the DM client, as well as between the DS server and the DM server, can be arbitrary. For example, these interfaces may include WSI (Web Service Interface), file interface. Alternatively, the DS client and DM client, as well as the DS server and DM server may share one file. An OMA device management protocol is adopted between the DM client and DM server.

The above-described DS client, DS server, DM client and DM server are all logic entities. The DS client and the DM client may reside on the same or different physical entity, and the DS server and the DM server may reside on the same or different physical entity.

With respect to the foregoing embodiments, the client device capability and the server device capability may be the entire device capability, or the device capability required in the current synchronization interaction, or alternatively, may be the part of the device capability that has been changed compared to the last one. The data package of all or parts of nodes to which the management object corresponds includes, but not limited to, data from sub-tree, sub-tree structure, or node property of the management object tree, or any combination thereof.

Because the structure of the Client DS MO and the Server DS MO are similar, only the Client DS MO is illustrated below as an example. The illustration also applies to the Server DS MO.

Figure 11:
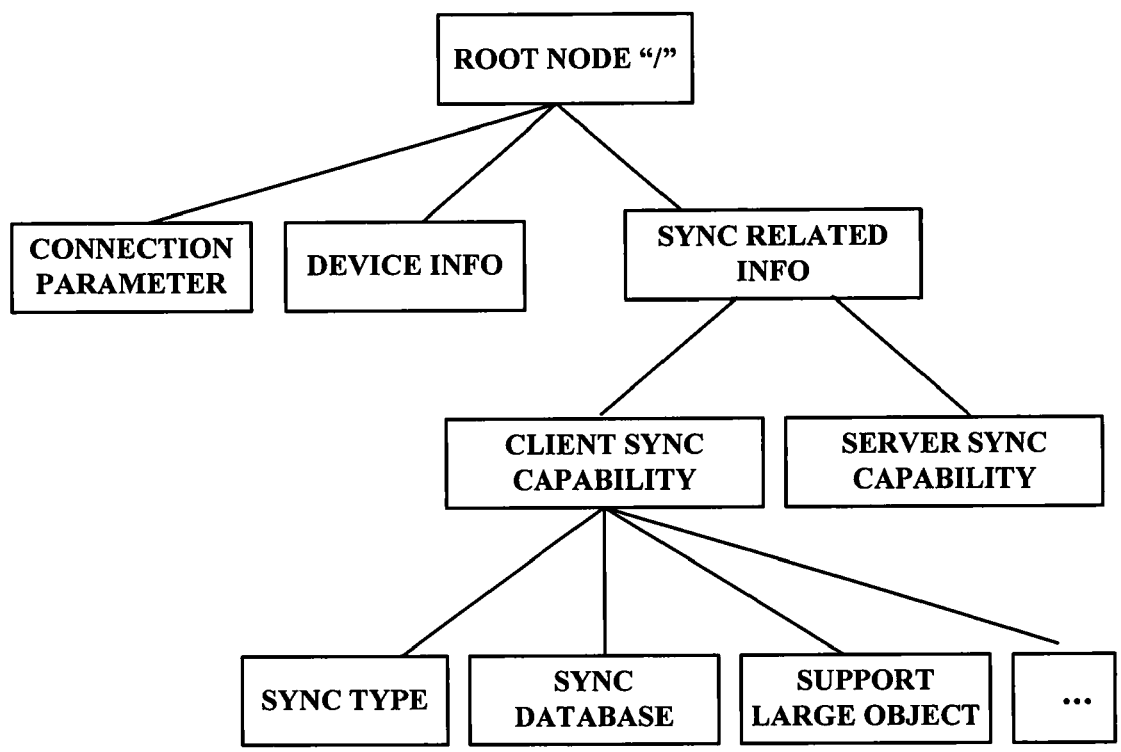
FIG. 11 is an illustration of structure of client management tree employed by an embodiment of embodiments of the present invention.
Figure 12:
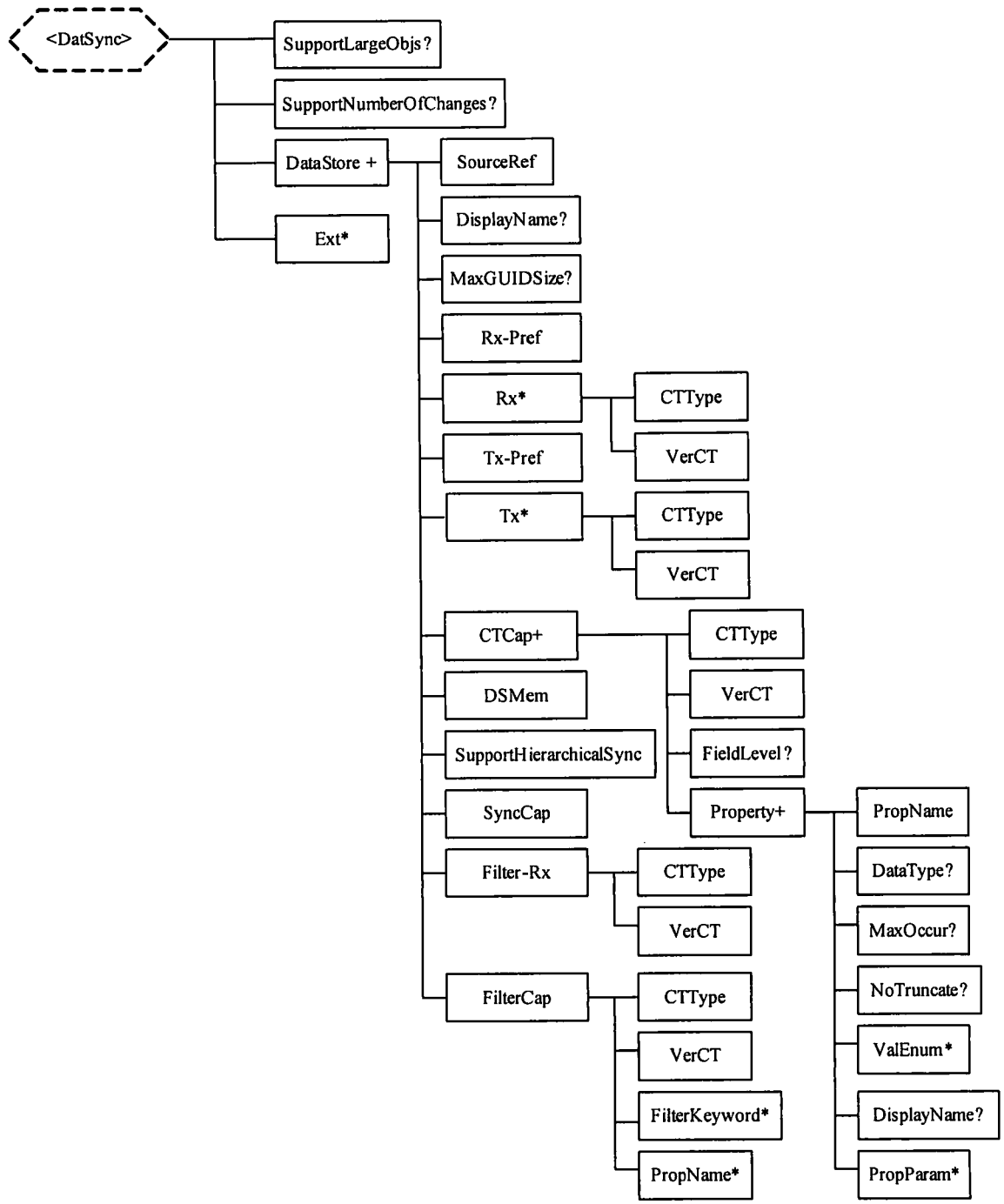
FIG. 12 is a specific embodiments with respect to the client management object regarding the device capability based on FIG. 11.

Referring to FIG. 11, FIG. 11 is an illustration of the structure of client management tree. "synchronization related information" in the right part of the figure, and the sub-nodes thereof is the newly added Client DS MO according to embodiments of the present invention. Of course, the details, for instance, what kind of information is needed, how to classify these information, etc., may be determined according to practical needs. The description herein is merely for illustration. One may refer to FIG. 12 which is an implementation based on the "synchronization related information" of FIG. 11.

As for the method implemented by the DM approach, the DS client, DM client, DM server and DS server are required to cooperate, one with another, in order to implement the method.

Figure 13:
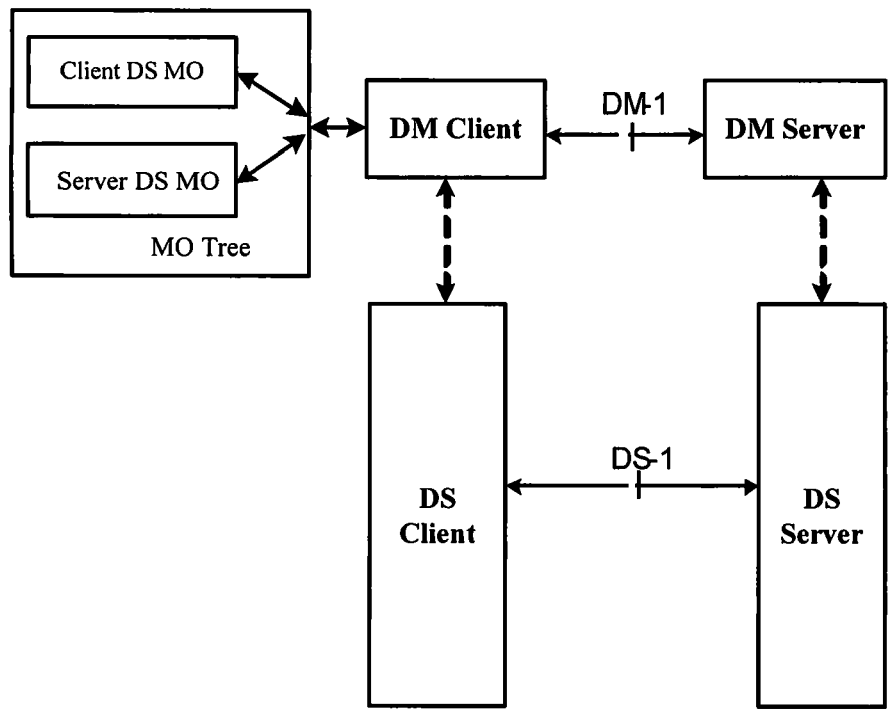
FIG. 13 is an illustration of an architecture according to a first embodiment of a synchronization system of embodiments of the present invention.

Referring to FIG. 13, the first embodiment of the synchronization system according to embodiments of the present invention includes a DS client, a DS server, a DM client and a DM server. The DM server provides management, diagnose and maintenance of the terminal device. It manages the terminal device using Over the Air (OTA) technology. The management operation includes functionalities of setting parameters, updating the firmware, installing and upgrading the software, gathering and processing the errors and event information for the terminal device, etc. The terminal device includes cell phone terminal, handheld computer, portable computer, embedded device, vehicle carrier system, etc., and does not exclude any other mobile devices. The DM client, which is a client installed on the terminal device, may be used to interact with the DM server to accomplish the related management operation. The DS server receives the synchronization request and synchronization data from the DS client, implements the operation of data synchronization, and stores the data of the server. The DS client, which is a synchronization client installed on the terminal device, interacts with the DS server to accomplish the data synchronization operation and stores the data of the client. The functionalities described above are the functionalities that each logic entity already possessed in the prior art. The new functionalities added according to embodiments of the present invention are illustrated below.

The DS client in such system can also be used to send a request for a device capability negotiation to the DM client, or receive the server device capability from the DM client, or perform authentication with the DM client.

The DM client may also be used to acquire Client DS MO for storing client device capability from the defined DM management tree and communicate with the DM server under the control of OMA device management protocol. Alternatively, the DM client may send the server device capability from the DM server or the server device capability from the Server DS MO to the DS client.

The DM server may also be used to send the client device capability in the Client DS MO from the DM client to the DS server. Alternatively, the DS server may acquire server device capability and directly send the server device capability to the DM client, or send the Server DS MO including server device capability to the DM client.

The DS server may also be used to receive client device capability from the DM server, or request for the device capability of DS client via DM server, or send its device capability to the DM server.

The foregoing DS client, DS server, DM client and DM server are all logic entities. The DS client and the DM client may reside on the same or different physical entity, and the DS server and the DM server may reside on the same or different physical entity.

Figure 14:
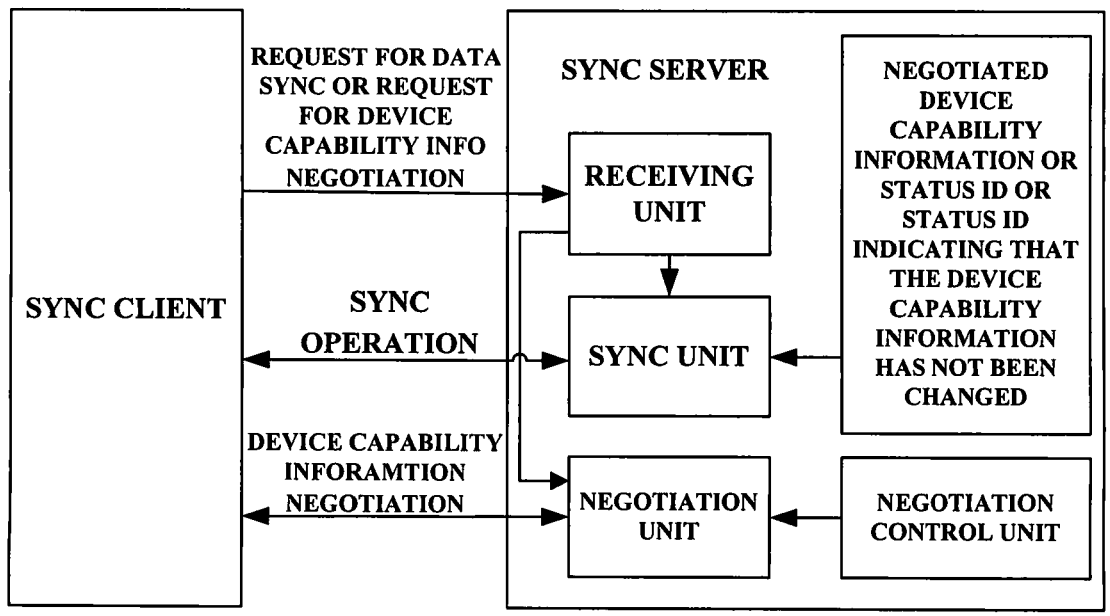
FIG. 14 is an illustration of an architecture according to a second embodiment of a synchronization system of embodiments of the present invention.

Referring to FIG. 14, the second embodiment of the synchronization system according to embodiments of the present invention includes a synchronization server and a synchronization client. The synchronization server or synchronization client is adapted to skip a device capability negotiation and directly perform a synchronization operation with the synchronization server and the synchronization client when the negotiated device capability or status ID, or the status ID indicating that the device capability has not been changed and has been stored.

It can be seen from the above that by determining whether the device capability or status ID, or the status ID indicating that the device capability has not been changed or has been stored, the foregoing embodiments skips a device capability negotiation process when it is determined that the current session does not require a device capability negotiation. As such, the synchronization protocol is simplified and the synchronization efficiency is improved. Moreover, changes in the synchronization procedure due to the changes in the device capability negotiation procedure can be avoided and the technical problem that the data synchronization specification is frequently modified can thus be avoided.

In another embodiment, the synchronization server further includes a receiving unit and a synchronization unit. The receiving unit is adapted to receive a request for data synchronization from the synchronization client and trigger the synchronization unit to perform a synchronization operation.

In yet another embodiment, the synchronization server further includes a receiving unit, a negotiation unit and a negotiation control unit. The receiving unit is adapted to receive a request for a device capability negotiation from the synchronization client. The negotiation unit is adapted to perform negotiation operation before the synchronization after receiving the request for device capability and returning the response information. The negotiation control unit is adapted to control the negotiation unit to perform or not perform a device capability negotiation according to the information indicating whether or not to perform a device capability negotiation.

The above two embodiments can be combined into one embodiments, which means that the receiving unit may not only receive the request for dada synchronization from the synchronization client, but may also receive the request for a device capability negotiation from the synchronization client as well.

Figure 15:
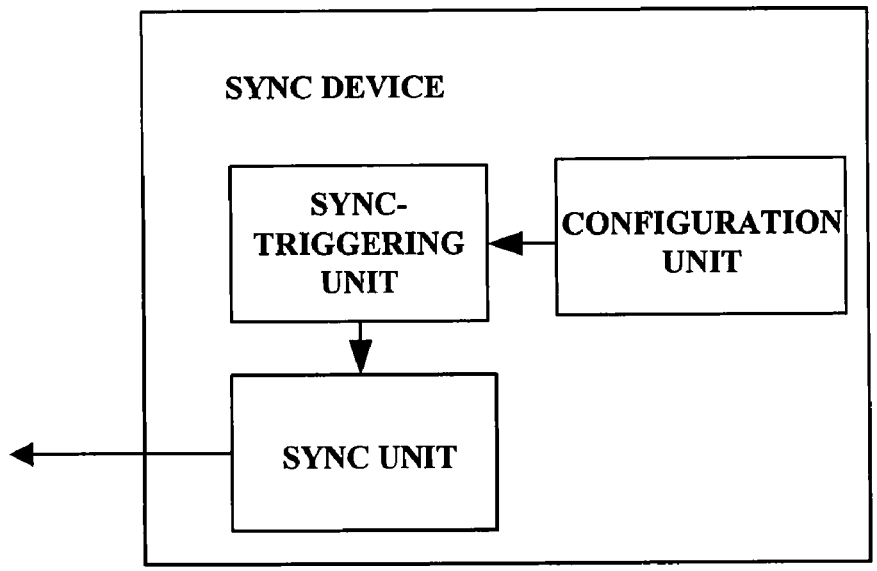
FIG. 15 is an an illustration of an architecture according to a first embodiment of a synchronization device of embodiments of the present invention.

Referring to FIG. 15, the first embodiment of a synchronization device according to embodiments of the present invention includes a configuration unit adapted to store the negotiated device capability or status ID, or the status ID indicating that the device capability has not been changed; a synchronization-triggering unit adapted to skip the device capability negotiation and directly trigger the synchronization operation when the negotiated device capability or status ID, or the status ID indicating that the device capability has not been changed and has been stored.

This embodiment may achieve the technical effect similar to that of the second embodiment of the synchronization system according to embodiments of the present invention.

The synchronization device may be a synchronization server or client, or terminal. In another embodiment, the synchronization device may further include a synchronization unit adapted to perform a synchronization operation when triggered by the synchronization-triggering unit.

Figure 16:
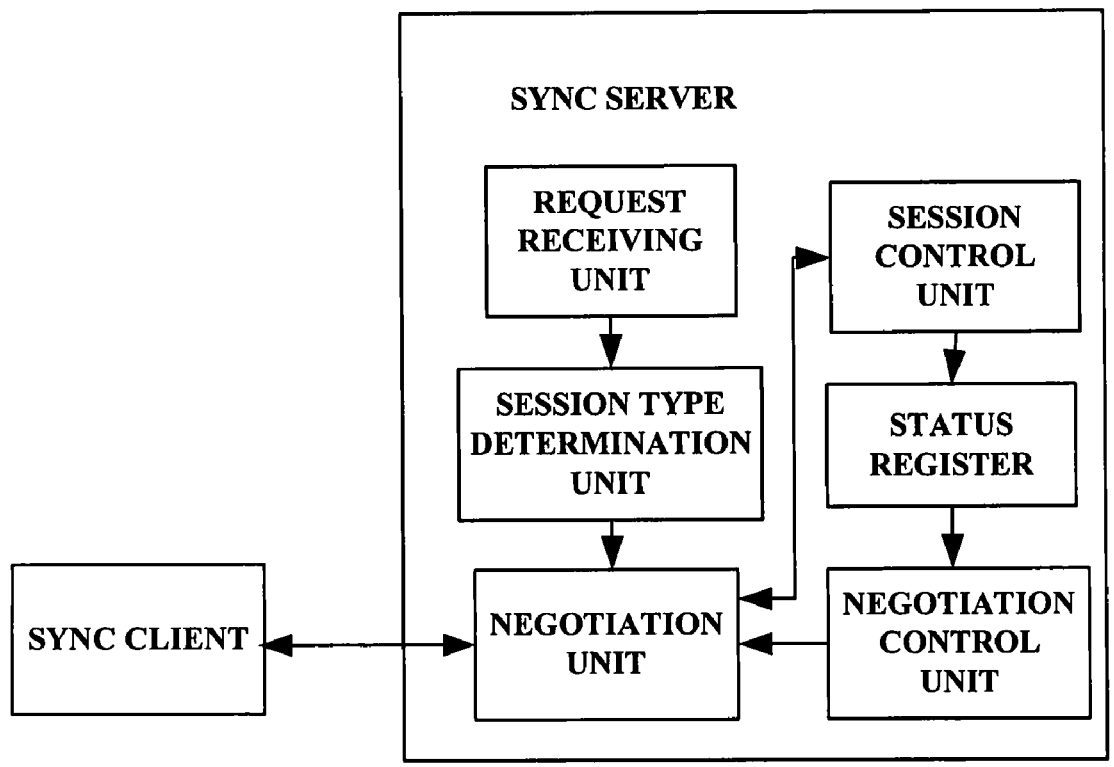
FIG. 16 is an illustration of an architecture according to a second embodiment of the synchronization server of embodiments of the present invention.

Referring to FIG. 16, the second embodiment of the synchronization server according to embodiments of the present invention includes a request receiving unit adapted to receive in a session an operation request that carries a parameter requesting a device capability negotiation; a session type determination unit adapted to determine that the current session is a device capability negotiation session according to the parameter requesting a device capability negotiation, carried by the operation request; a negotiation unit adapted to perform a device capability negotiation after the current session is determined to be the device capability negotiation session; and a session control unit adapted to store the results of the device capability negotiation and close the session.

It can be seen from the above description that the above embodiments distinguishes itself from the session synchronization of the prior art by utilizing the session type determination unit to identify the type of operation request and to determine that the current session is a device capability negotiation session. Then, the session control unit is used to store the negotiation results. As such, the device capability negotiation process can be skipped when conducting the next synchronization. Accordingly, the synchronization protocol is simplified and the synchronization efficiency is improved. Moreover, changes in the synchronization procedure due to the changes in the device capability negotiation procedure can be avoided and the technical problem that the data synchronization specification is frequently modified can thus be avoided.

In other embodiments, the second embodiment of the synchronization server according to embodiments of the present invention may further include a status register and a negotiation control unit. The status register is adapted to store the information indicating whether or not to perform a device capability negotiation. The negotiation control unit is adapted to control the negotiation unit to perform or not perform a device capability negotiation according to the information indicating whether or not to perform a device capability negotiation.

Figure 17:
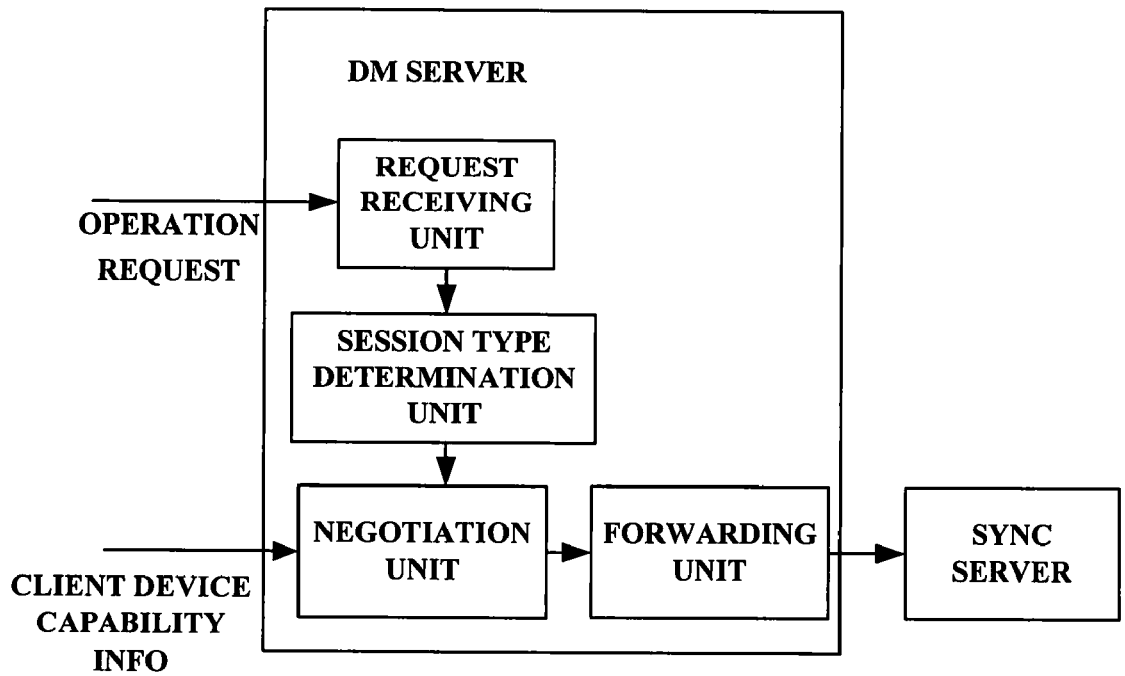
FIG. 17 is an illustration of an architecture according to a first embodiment of a DM server of embodiments of the present invention.

Referring to FIG. 17, the first embodiment of the DM server according to embodiments of the present invention includes a request receiving unit adapted to receive in a session an operation request that carries a client synchronization management object identifier requiring the DM server to acquire; a session type determination unit adapted to determine that the current session is a device capability negotiation session according to the operation request, a negotiation unit adapted to issue a specific operation command according to the client synchronization management object identifier after the current session is determined to be the device capability negotiation session and receive a reported client device capability; a forwarding unit adapted to send the received client device capability to a synchronization server.

This embodiment may achieve the technical effect similar to that of the first embodiment of the DM server according to embodiments of the present invention.

Figure 18:
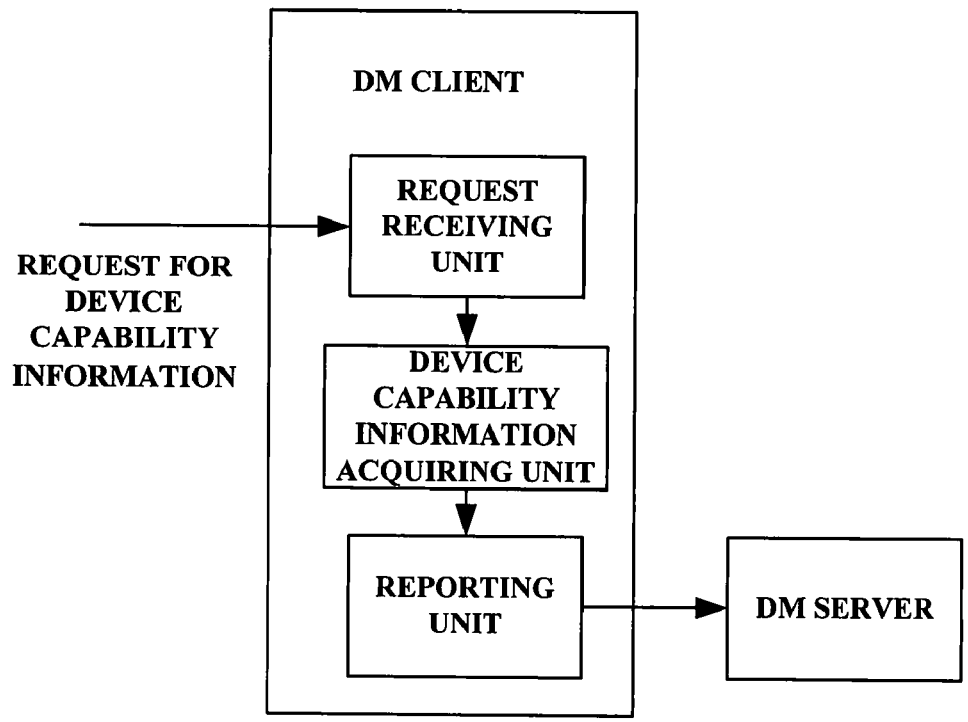
FIG. 18 is an illustration of an architecture according to a first embodiment of a DM client of embodiments of the present invention.

Referring to FIG. 18, the first embodiment of the DM client according to embodiments of the present invention includes a request receiving unit adapted to receive in a session a request for device capability of a synchronization client; a device capability acquiring unit adapted to read the data from all or part of the nodes to which the configured synchronization management object of the synchronization client corresponds and obtain the client device capability to be reported; a reporting unit adapted to initiate an operation request towards a DM server, the operation request including a request for initial session connection, and carrying the client device capability.

The first embodiment of the DM client according to embodiments of the present invention cooperates with the first embodiment of the DM server according to embodiments of the present invention to achieve the technical effect of the simplified synchronization protocol and the improved synchronization efficiency.

Figure 19:
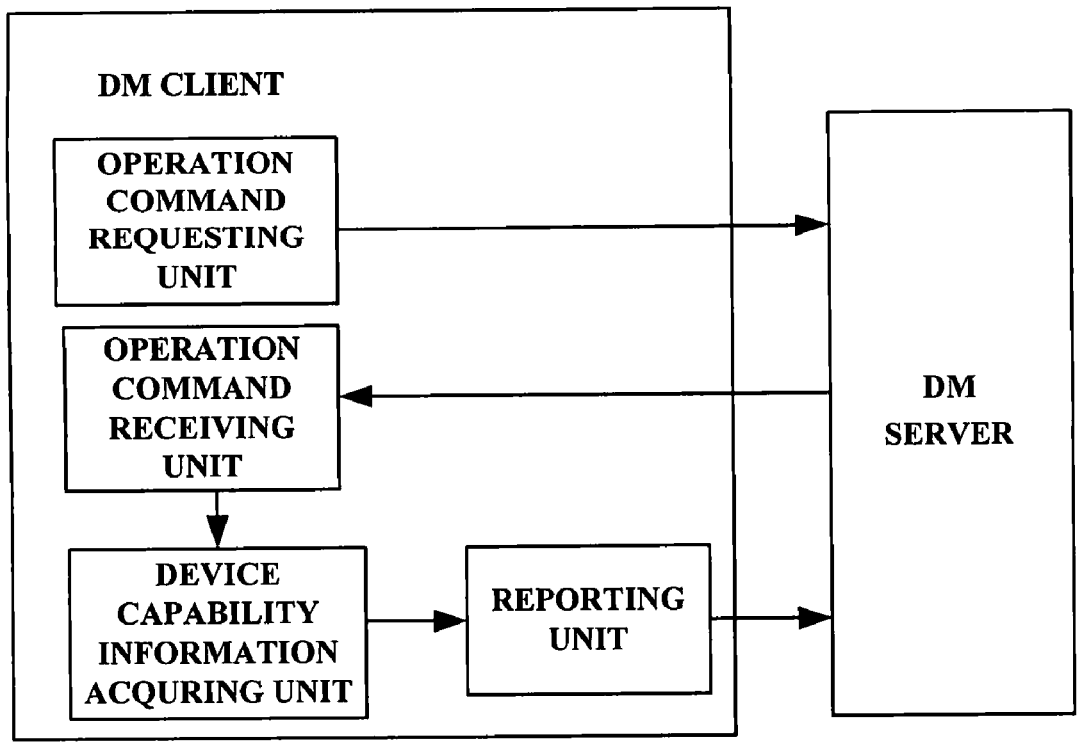
FIG. 19 is an illustration of an architecture according to a second embodiment of a DM client of embodiments of the present invention.

Referring to FIG. 19, the second embodiment of the DM client according to embodiments of the present invention includes an operation command requesting unit adapted to initiate a request for initial session connection towards DM server and carry in the request for initial session connection a client synchronization management object identifier requiring the DM server to acquire; an operation command receiving unit adapted to receive an operation command corresponding to the client synchronization management object identifier, a device capability acquiring unit adapted to read the data from all or parts of the nodes to which the configured synchronization management object of the synchronization client corresponds and obtain client device capability to be reported; a reporting unit adapted to send towards the DM server response information to the operation command, the response information carrying the client device capability.

The first embodiment of the DM client according to embodiments of the present invention cooperates with the second embodiment of the DM server according to embodiments of the present invention to implement the technical effect of the simplification of the synchronization protocol and the improvement of the synchronization efficiency.

The third embodiment of the synchronization server according to embodiments of the present invention includes a request receiving unit adapted to receive in a session an operation request that carries a parameter requesting a device capability negotiation, the parameter carrying information for acquiring the device capability of the synchronization server; a session type determination unit adapted to determine that the current session is a device capability negotiation session according to the parameter requesting a device capability negotiation, carried by the operation request; a negotiation unit adapted to deliver its device capability down to the synchronization client after the current session is determined to be the device capability negotiation session and inform the synchronization client to store the results of the device capability negotiation and close the session.

The third embodiment of the synchronization server according to embodiments of the present invention may implement the functionality of delivering the device capability down to the synchronization client. Similar to those of the first and second embodiment of the synchronization server according to embodiments of the present invention, the second embodiments achieves the technical effect of a simplified synchronization protocol and the improved synchronization efficiency.

Figure 20:
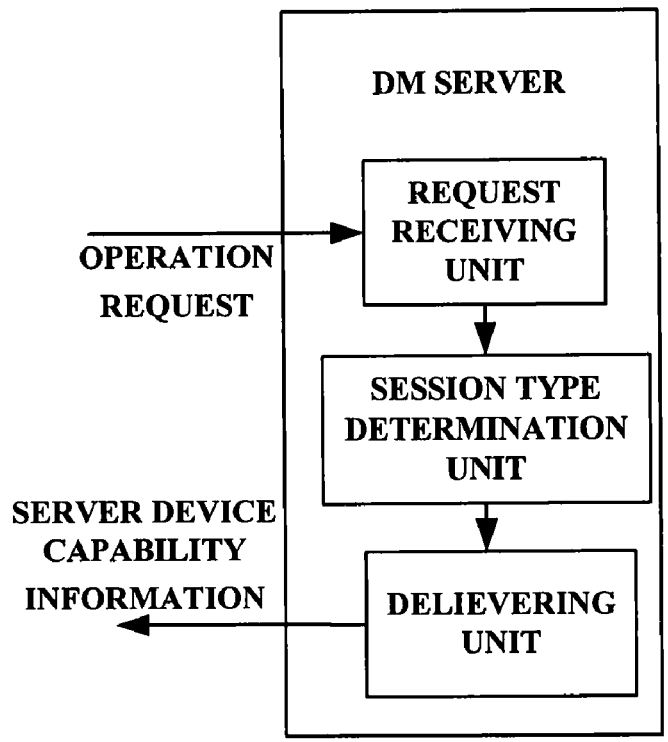
FIG. 20 is an illustration of an architecture according to a second embodiment of a DM server of embodiments of the present invention.

Referring to FIG. 20, the second embodiment of the DM server according to embodiments of the present invention includes a request receiving unit adapted to receive in a session an operation request that carries a parameter requesting a device capability negotiation, the parameter carrying information for acquiring device capability of the synchronization server; a session type determination unit adapted to determine that the current session is a device capability negotiation session according to the parameter requesting a device capability negotiation, carried by the operation request; a device capability acquiring unit adapted to acquire device capability from the synchronization server after the current session is determined to be the device capability negotiation session; a delivering unit adapted to send the device capability of the synchronization server to the synchronization client via a DM client for storage and close the session.

The second embodiment of the DM server according to embodiments of the present invention implements the function of delivering the device capability down to the synchronization client. Similar to that of the third embodiment of the synchronization server according to embodiments of the present invention, the second embodiments achieves the technical effect of a simplified synchronization protocol and the improved synchronization efficiency.

The foregoing teachings are merely a number of exemplary embodiments of embodiments of the present invention, which shall not be used to delineate the scope of protection of embodiments of the present invention. Any modification, equivalents, improvements, etc can be made within the spirit and the scope of embodiments of the present invention and shall be included in the scope of protection of embodiments of the present invention.

What is claimed is:

1. A method for SyncML data synchronization comprising:
receiving, by a first device, a request for data synchronization from a second device;
determining, by the first device, if the first device has a first status ID, which corresponds to an ID of a synchronization client of the second device initiating the request, indicating completion of a previous device capability negotiation between the first and second devices, or, has a second status ID indicating that the device capability of the first device and the second device has not been changed since the previous device capability negotiation between the first and second devices;
skipping the device capability negotiation, if it is determined that the first device has the first status ID or the second status ID, and further performing a synchronization operation;
returning, by the first device, to the second device a response requesting performing a part of the device capability negotiation, if it is determined that the first device does not store both the first status ID and the second status ID;
where the performing a part of the device capability negotiation comprises:
negotiating a part of the device capability which has been changed since the previous device capability negotiation; or
negotiating a part of the device capability which is specified for negotiation by a URI.

2. The method of claim 1, after returning to the second device a response requesting performing a part of the device capability negotiation, the method further comprises:
receiving an operation request, the operation request carries a parameter requesting a device capability negotiation;
determining that a session is a device capability negotiation session according to the parameter requesting a device capability negotiation, carried by the operation request;
returning a response and performing the device capability negotiation; and
storing results of the device capability negotiation and updating the status ID.

3. The method of claim 1, wherein the second status ID indicating that the device capability of the second device has not been changed is included in the request for data synchronization from a second device.

4. A method for device capability negotiation for SyncML data synchronization, comprising:
receiving an operation request through a device capability operation session, the operation request carries a parameter requesting a device capability negotiation;
determining that a session is a device capability negotiation session according to the parameter requesting the device capability negotiation, carried by the operation request;
wherein the parameter requesting the device capability negotiation is: a data type indicative of negotiating all of the device capability, a data type carrying the information of negotiating the associated device capability, a URI specifying the device capability to be negotiated, or an expression specifying the device capability to be negotiated;
returning a response and performing the device capability negotiation according to the parameter; and
storing results of the device capability negotiation;
where the performing a device capability negotiation comprises:
negotiating a part of the device capability which has been changed since a previous device capability negotiation; or
negotiating a part of the device capability which is specified for negotiation by a URI;
wherein the operation request includes add, update, delete or query commands, and when the parameter is the URI specifying the device capability to be negotiated, the manner used for a device capability negotiation comprises: acquiring the device capability via operation commands of XCAP protocol according to the URI.

5. A method for device capability negotiation for SyncML data synchronization, comprising:
sending a request for device capability to a DM client;
initiating a device management procedure, sending an operation request carrying a parameter requesting a device capability negotiation to a DM server, and informing the DM server to acquire the device capability after the DM client receives the device capability;
receiving the operation request via a device management (DM) protocol, the operation request carries the parameter requesting the device capability negotiation;
determining that a session is a device capability negotiation session according to the parameter requesting a device capability negotiation, carried by the operation request;
returning a response and performing the device capability negotiation, wherein the performing a device capability negotiation comprises: sending, by the DM server, the device capability to a synchronization server; and
storing results of the device capability negotiation;
where the performing a device capability negotiation comprises:
negotiating a part of the device capability which has been changed since a previous device capability negotiation; or
negotiating a part of the device capability which is specified for negotiation by a URI;
wherein:

the initiating the device management procedure, sending the operation request and informing a DM server to acquire a client device capability comprise:

reading data to which a configured synchronization management object of a synchronization client corresponds and acquiring device capability of a synchronization client to be reported; sending a request for initial session connection to the DM server and carrying the synchronization client device capability in the request for initial session connection; or initiating, by the client, a request for initial session connection to the DM server and carrying in the request for initial session connection a client synchronization management object identifier requiring the DM server to acquire; issuing an operation command, by the DM server, according to the received client synchronization management object identifier; reading data to which the configured client synchronization management object corresponds according to the operation command and acquiring the client device capability to be reported; sending response information to the request for initial session connection to the DM server and carrying the client device capability in the response information.

6. A system for SyncML data synchronization, comprising:
a synchronization server having a processor, a memory coupled to the processor and a synchronization client, wherein the synchronization server comprises a receiving unit adapted to receive a request for data synchronization from the synchronization client;

the synchronization server is adapted to determine if the synchronization server has a first status ID, which corresponds to an ID of the synchronization client initiating the request, indicating the completion of the previous device capability negotiation between the synchronization server and the synchronization client, or a second status ID indicating that the device capability of the synchronization server and the synchronization client has not been changed since the previous device capability negotiation between the synchronization server and the synchronization client; skip the device capability negotiation, if it is determined that the synchronization server has the first status ID or the second status ID, and further perform a synchronization operation; return to the synchronization client a response requesting performing a part of the device capability negotiation, if it is determined that the synchronization server does not store both the first status D and the second status ID;

where the performing a part of the device capability negotiation comprises:

negotiating a part of the device capability which has been changed since the previous device capability negotiation; or negotiating a part of the device capability which is specified for negotiation by a URI.

7. A server for SyncML data synchronization, comprising:
a processor and a memory coupled to the processor;

a request receiving unit adapted to receive in a session an operation request carrying a parameter requesting a device capability negotiation, wherein the receiving the operation request comprises receiving the operation request through a device capability operation session;

a session type determination unit adapted to determine that the session is a device capability negotiation session according to the parameter requesting the device capability negotiation, carried by the operation request; wherein the parameter requesting the device capability negotiation is: a data type indicative of negotiating all of the device capability, a data type carrying the information of negotiating the associated device capability, a URI specifying the device capability to be negotiated, or an expression specifying the device capability to be negotiated;

a negotiation unit adapted to perform the device capability negotiation according to the parameter after the session is determined to be a device capability negotiation session; and a session control unit adapted to store the results of the device capability negotiation;

where the performing the device capability negotiation comprises:

negotiating a part of the device capability which has been changed since the previous device capability negotiation; or negotiating a part of the device capability which is specified for negotiation by a URI;

wherein the operation request includes add, update, delete or query commands, and when the parameter is the URI specifying the device capability to be negotiated, the manner used for a device capability negotiation comprises: acquiring the device capability via operation commands of XCAP protocol according to the URI.

8. A method for SyncML data synchronization, comprising:

initiating, by a synchronization client, an operation request towards a synchronization server;

determining, by synchronization server, if the synchronization server has a first status ID, which corresponds to an ID of the synchronization client initiating the request, indicating the completion of the previous device capability negotiation between the synchronization server and the synchronization client, or a second status ID indicating that the device capability of the synchronization server and the synchronization client has not been changed since the previous device capability negotiation between the synchronization server and the synchronization client;

performing synchronization if the synchronization server determines that the received operation request is a request for data synchronization and the synchronization server has the first status ID, or the second status ID; and performing a part of device capability negotiation if the synchronization server determines that the received operation request is a request for a device capability negotiation and that the synchronization server does not store both the first status ID and the second status ID;

returning, to the synchronization client, a response requesting a device capability negotiation if the synchronization server determines that the received operation request is a request for data synchronization and confirms that that the synchronization server does not store both the first status ID and the second status ID, and performing the part of the device capability negotiation according to the returned device capability from the client, and performing synchronization;

where the performing a part of the device capability negotiation comprises:

negotiating a part of the device capability which has been changed since the previous device capability negotiation; or negotiating a part of the device capability which is specified for negotiation by a URI.

* * * * *